(12) United States Patent
George et al.

(10) Patent No.: US 12,511,472 B2
(45) Date of Patent: Dec. 30, 2025

(54) FRAGMENTING SPREADSHEETS

(71) Applicant: Georgetown Software House, Inc., Washington, DC (US)

(72) Inventors: Bediako Ntodi George, Washington, DC (US); Archibald Marcel Édouard Pontier, Allogny (FR)

(73) Assignee: Georgetown Software House, Inc., Washington, DC (US)

( * ) Notice: Subject to any disclaimer, the term of this patent is extended or adjusted under 35 U.S.C. 154(b) by 522 days.

(21) Appl. No.: 18/103,334

(22) Filed: Jan. 30, 2023

(65) Prior Publication Data

US 2023/0244864 A1 Aug. 3, 2023

Related U.S. Application Data

(60) Provisional application No. 63/316,566, filed on Mar. 4, 2022, provisional application No. 63/305,346, filed on Feb. 1, 2022.

(51) Int. Cl.
*G06F 40/18* (2020.01)
(52) U.S. Cl.
CPC .................................. *G06F 40/18* (2020.01)
(58) Field of Classification Search
CPC ...................................................... G06F 40/18
See application file for complete search history.

(56) References Cited

U.S. PATENT DOCUMENTS

| 8,082,489 | B2 * | 12/2011 | Jiang | G06F 40/205 |
| | | | | 715/212 |
| 9,959,098 | B1 * | 5/2018 | Smith Devine | G06F 40/18 |
| 11,157,690 | B2 * | 10/2021 | Zusman | G06F 40/18 |
| 11,308,269 | B1 * | 4/2022 | Rodgers | G06F 40/18 |
| 11,561,967 | B2 * | 1/2023 | Seiden | G06F 16/24573 |
| 2006/0095833 | A1 * | 5/2006 | Orchard | G06F 40/18 |
| | | | | 715/764 |
| 2008/0126407 | A1 * | 5/2008 | Shimaoka | G06F 8/355 |
| 2009/0006939 | A1 * | 1/2009 | DeSpain | G06F 40/18 |
| | | | | 715/217 |
| 2015/0309967 | A1 * | 10/2015 | Presler-Marshall | ......... |
| | | | | G06F 40/117 |
| | | | | 715/212 |

(Continued)

*Primary Examiner* — Barbara M Level
(74) *Attorney, Agent, or Firm* — Bass Patent Law, LLC

(57) ABSTRACT

The present teachings include techniques and systems for processing spreadsheets at the level of a worksheet or another collection of cells, including the fragmenting of spreadsheets. For example, a spreadsheet may include one or more input worksheets, output worksheets, and/or transient worksheets, where transient worksheets utilize input data in input worksheets to facilitate creation of output data in output worksheets. In particular, fragmenting a spreadsheet may include determining, for each output worksheet, what input and transient worksheets are needed to create output data in the output worksheet, and then creating a plurality of fragments therefrom. Thus, fragmenting a spreadsheet may include a temporal and/or physical decoupling of the spreadsheet's worksheets. This can be useful for, inter alia, understanding the relationships between a plurality of worksheets, isolating certain processing tasks, editing or interchanging worksheets, and/or for improving computational performance, e.g., by routing particular fragments to appropriate computational resources for processing thereof.

20 Claims, 9 Drawing Sheets

(56) References Cited

U.S. PATENT DOCUMENTS

2017/0315979 A1* 11/2017 Boucher ............... G06Q 10/101
2022/0067271 A1* 3/2022 Logan ................. H04L 67/1097

* cited by examiner

FRAGMENTING SPREADSHEETS

CROSS-REFERENCE TO RELATED APPLICATIONS

This application claims priority to U.S. Provisional Patent App. No. 63/316,566 filed on Mar. 4, 2022 and U.S. Provisional Patent App. No. 63/305,346 filed on Feb. 1, 2022, where the entire content of each of the foregoing applications is hereby incorporated by reference.

FIELD

The present disclosure generally relates to systems and techniques for processing spreadsheets at a worksheet level, e.g., techniques for fragmenting a spreadsheet into one or more fragments, each fragment including a subset of worksheets from the spreadsheet.

BACKGROUND

A spreadsheet is a document including a plurality of cells containing data items such as numbers, strings, dates, and so on. Cells may also or instead include instructions—e.g., computational instructions such as formulas and functions, and/or snippets of code, pointers and references to other cells, and the like. Cells may also or instead contain other types of information such as data formatting information, presentation information, form widgets, descriptive notes or comments, and so on. Cells in a spreadsheet may be arranged in a geometric fashion, typically in rows and columns having unique names. These rows and columns can also be grouped, where these groups are typically referred to as worksheets. A cell's location in a spreadsheet is usually specified using a combination of the worksheet name and the row/column in which the cell resides.

The execution of instructions contained within a particular worksheet may depend on information within another worksheet of the same spreadsheet. For example, data in a first worksheet may be used as an input to a formula in a second worksheet. A spreadsheet having multiple interdependent worksheets may be difficult to interpret, and may be computationally intensive to run for large datasets. Further, computational operations and the like may not be able to function properly (or at all) in a spreadsheet where all input and/or transient or otherwise dependent worksheets are unavailable.

There is a need for improved systems and techniques to run spreadsheet computations at scale, e.g., without using excessive computational resources. There is also a need for improved systems and techniques for visualization of dependencies within spreadsheets. There is also a need for temporal and/or physical decoupling of worksheets of a spreadsheet.

SUMMARY

The present teachings include techniques and systems for processing spreadsheets at the level of a worksheet or another collection of cells, including the fragmenting of spreadsheets. For example, a spreadsheet may include one or more input worksheets, output worksheets, and/or transient worksheets, where transient worksheets utilize input data in input worksheets to facilitate creation of output data in output worksheets. In particular, fragmenting a spreadsheet may include determining, for each output worksheet, what input and transient worksheets are needed to create output data in the output worksheet, and then creating a plurality of fragments therefrom. Thus, fragmenting a spreadsheet may include a temporal and/or physical decoupling of the spreadsheet's worksheets. This can be useful for, inter alia, understanding the relationships between a plurality of worksheets, isolating certain processing tasks, editing or interchanging worksheets, and/or for improving computational performance, e.g., by routing particular fragments to appropriate computational resources for processing thereof.

In an aspect, a method of processing spreadsheets at a worksheet level disclosed herein may include: receiving a spreadsheet having a plurality of worksheets, the plurality of worksheets including a combination of at least one input worksheet, at least one output worksheet, and at least one transient worksheet, where the transient worksheet utilizes input data in the input worksheet to facilitate creation of output data in the output worksheet; and fragmenting the spreadsheet. Fragmenting the spreadsheet may include: determining, for a first output worksheet that creates first output data, which one or more first transient worksheets is used to create the first output data in the first output worksheet, and which one or more first input worksheets is used by the one or more first transient worksheets to create the first output data in the first output worksheet; and creating a first fragment including the first output worksheet, the one or more first transient worksheets, and the one or more first input worksheets that are used to create the first output data. The method may also include providing the first fragment on a display of a computing device, and displaying, upon selection of at least a portion of the first fragment by a user of the computing device, a relationship between the first output worksheet, the one or more first transient worksheets, and the one or more first input worksheets used to create the first output data.

Implementations may include one or more of the following features. The method may further include repeating the fragmenting of the spreadsheet for a plurality of output worksheets contained in the spreadsheet to create a plurality of fragments including the first fragment. Fragmenting of the spreadsheet may be repeated for all of the output worksheets of the spreadsheet to create the plurality of fragments. Fragmenting of the spreadsheet may be repeated for all worksheets of the spreadsheet to create the plurality of fragments. The method may further include providing the plurality of fragments on the display of the computing device. The method may further include labeling components of each of the plurality of fragments on the display. Labeling components may include marking the components by type. Marking the components by type may include assigning a color to components based on type. Relationships between components of each of the plurality of fragments may be displayed by connecting related components to one another. The method may further include receiving a selection of a component of at least one fragment of the plurality of fragments, the component including one or more of an input worksheet, a transient worksheet, and an output worksheet contained within the at least one fragment. The method may further include, in response to the selection, displaying each component of the at least one fragment that is related to the selected component. The method may further include, in response to the selection, creating a processing task that includes the at least one fragment. The method may further include evaluating an associated processing demand for the processing task. The method may further include evaluating one or more processors and using the evaluation of the one or more processors in combination with the evaluation of the associated processing demand as bases for distributing each of the plurality of fragments to the one or more processors. Creating the processing task may include creating a spreadsheet that includes components of the at least one fragment. The method may further include: providing a plurality of datapoints on the display of the computing device, where each of the plurality of datapoints is associated with one or more components of one or more of the plurality of fragments; receiving a selection of at least one datapoint of the plurality of datapoints; and displaying the one or more components of the one or more of the plurality of fragments that are associated with the selected datapoint. The plurality of datapoints may include one or more of a unique identifier and a field.

In an aspect, a computer program product for processing spreadsheets at a worksheet level disclosed herein may include computer executable code embodied in a non-transitory computer readable medium that, when executing on one or more computing devices, performs the steps of: receiving a spreadsheet having a plurality of worksheets, the plurality of worksheets including a combination of at least one input worksheet, at least one output worksheet, and at least one transient worksheet, where the transient worksheet utilizes input data in the input worksheet to facilitate creation of output data in the output worksheet; and fragmenting the spreadsheet. Fragmenting the spreadsheet may include: determining, for a first output worksheet that creates first output data, which one or more first transient worksheets is used to create the first output data in the first output worksheet, and which one or more first input worksheets is used by the one or more first transient worksheets to create the first output data in the first output worksheet; and creating a first fragment including the first output worksheet, the one or more first transient worksheets, and the one or more first input worksheets that are used to create the first output data. The computer program product may also include code that, when executed, provides the first fragment on a display of a computing device, and displays, upon selection of at least a portion of the first fragment by a user of the computing device, a relationship between the first output worksheet, the one or more first transient worksheets, and the one or more first input worksheets that are used to create the first output data.

In an aspect, a system for processing spreadsheets at a worksheet level disclosed herein may include: a data network; a user device coupled to the data network; and a remote computing resource coupled to the data network and accessible to the user device through the data network, the remote computing resource including a processor and a memory. The memory may store code executable by the processor to perform the steps of: receiving, over the data network, a spreadsheet having a plurality of worksheets, the plurality of worksheets including a combination of at least one input worksheet, at least one output worksheet, and at least one transient worksheet, where the transient worksheet utilizes input data in the input worksheet to facilitate creation of output data in the output worksheet; and fragmenting the spreadsheet. Fragmenting the spreadsheet may include: determining, for a first output worksheet that creates first output data, which one or more first transient worksheets is used to create the first output data in the first output worksheet, and which one or more first input worksheets is used by the one or more first transient worksheets to create the first output data in the first output worksheet; and creating a first fragment including the first output worksheet, the one or more first transient worksheets, and the one or more first input worksheets that are used to create the first output data. The memory may also store code executable by the processor to perform the steps of: providing the first fragment on a display of the user device; and displaying, upon selection of at least a portion of the first fragment by a user of the user device, a relationship between the first output worksheet, the one or more first transient worksheets, and the one or more first input worksheets that are used to create the first output data.

In an aspect, a method of processing spreadsheets to isolate processing tasks disclosed herein may include: receiving a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The method may also include: providing the plurality of fragments to a computing device of a user for selection of at least a portion of the plurality of fragments; receiving a selection of a component of at least one fragment of the plurality of fragments, the component including one or more of an input worksheet, a transient worksheet, and an output worksheet contained within the at least one fragment; and, in response to the selection, creating a processing task that includes the at least one fragment.

Implementations may include one or more of the following features. Creating the processing task may include creating a spreadsheet with worksheets including only components of the at least one fragment. The method may further include receiving an input from the user and processing the input according to the processing task. Only the processing task related to the at least one fragment may be performed to process the input, in the absence other processing tasks associated with the spreadsheet. The processing task may include the at least one fragment and input data.

In an aspect, a computer program product disclosed herein for processing spreadsheets to isolate processing tasks may include computer executable code embodied in a non-transitory computer readable medium that, when executing on one or more computing devices, performs the steps of: receiving a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The computer program product may also include code that, when executed, performs the steps of: providing the plurality of fragments to a computing device of a user for selection of at least a portion of the plurality of fragments; receiving a selection of a component of at least one fragment of the plurality of fragments, the component including one or more of an input worksheet, a transient worksheet, and an output worksheet contained within the at least one fragment; and, in response to the selection, creating a processing task that includes the at least one fragment.

In an aspect, a system for processing spreadsheets to isolate processing tasks may include: a data network; a user device coupled to the data network; and a remote computing resource coupled to the data network and accessible to the user device through the data network, the remote computing resource including a processor and a memory. The memory may store code executable by the processor to perform the steps of: receiving, over the data network, a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The memory may store code executable by the processor to perform the steps of: providing the plurality of fragments to the user device for selection of at least a portion of the plurality of fragments by a user; receiving a selection of a component of at least one fragment of the plurality of fragments, the component including one or more of an input worksheet, a transient worksheet, and an output worksheet contained within the at least one fragment; and, in response to the selection, creating a processing task that includes the at least one fragment.

A method of processing spreadsheets to enhance computational efficiency disclosed herein may include: receiving a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The method may also include: evaluating an associated processing demand for each of the plurality of fragments; and, based on the evaluation of the associated processing demand, distributing each of the plurality of fragments to a processor of a plurality of processors.

Implementations may include one or more of the following features. Fragments having a processing demand greater than a predetermined threshold may be distributed to one or more first processors, and fragments having a processing demand less than the predetermined threshold may be distributed to one or more second processors. The one or more first processors and the one or more second processors may be the same type of processors. The one or more first processors and the one or more second processors may be different types of processors. The one or more first processors and the one or more second processors may have different properties. The one or more first processors and the one or more second processors may have the same or similar properties. The method may further include evaluating one or more processors of the plurality of processors, and using the evaluation of the one or more processors in combination with the evaluation of the associated processing demand as bases for distributing each of the plurality of fragments to the one or more processors. The evaluation of the one or more processors may include at least one of an availability of the one or more processors and a processing capability of the one or more processors. The evaluation of the one or more processors may include a processing cost associated with the one or more processors. The evaluation of the one or more processors may include a processing time associated with using the one or more processors. The method may further include: determining, for each of the plurality of fragments, the presence of required input data for use by the one or more transient worksheets to create the associated output data; upon determining, for a first fragment of the plurality of fragments, that required input data is present, enabling processing of the first fragment; and, upon determining, for a second fragment of the plurality of fragments, that required input data is not present, delaying processing of the second fragment until a later time. The method may further include: storing associated output data for the first fragment; determining, for the second fragment at the later time, that required input data is present; enabling processing of the second fragment; and retrieving stored associated output data. The method may further include: providing at least one fragment of the plurality of fragments on a display of a computing device; and displaying, upon selection of at least a portion of the at least one fragment by a user of the computing device, a relationship between the particular output worksheet and the one or more transient worksheets and input worksheets that are used to create the associated output data. The method may further include providing the plurality of fragments on the display of the computing device. The method may further include labeling components of each of the plurality of fragments on the display. Labeling components may include assigning a color to components based on type. The method may further include receiving a selection of a component of at least one fragment of the plurality of fragments, the component including one or more of an input worksheet, a transient worksheet, and an output worksheet contained within the at least one fragment; and, in response to the selection, displaying each component of the at least one fragment that is related to the selected component. The method may further include: providing a plurality of datapoints on the display of the computing device, where each of the plurality of datapoints is associated with one or more components of one or more of the plurality of fragments; receiving a selection of at least one datapoint of the plurality of datapoints; and displaying the one or more components of the one or more of the plurality of fragments that are associated with the selected datapoint.

In an aspect, a computer program product for processing spreadsheets to enhance computational efficiency disclosed herein may include computer executable code embodied in a non-transitory computer readable medium that, when executing on one or more computing devices, performs the steps of: receiving a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The computer program product may also include code that, when executed, performs the steps of: evaluating an associated processing demand for each of the plurality of fragments; and, based on the evaluation of the associated processing demand, distributing each of the plurality of fragments to a processor of a plurality of processors.

In an aspect, a system for processing spreadsheets to enhance computational efficiency disclosed herein may include: a data network; a plurality of processors coupled to the data network; and a remote computing resource coupled to the data network, the remote computing resource including a processor and a memory. The memory may store code executable by the processor to perform the steps of: receiving, over the data network, a spreadsheet having a plurality of worksheets, the plurality of worksheets including a combination of a plurality of input worksheets, output worksheets, and transient worksheets, where the transient worksheets utilize input data in one or more of the input worksheets to facilitate creation of output data in one or more of the output worksheets; and fragmenting the spreadsheet. Fragmenting the spreadsheet may include: determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment including (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets. The memory may also store code executable by the processor to perform the steps of: evaluating an associated processing demand for each of the plurality of fragments; and, based on the evaluation of the associated processing demand, distributing each of the plurality of fragments to a processor of the plurality of processors.

In an aspect, a method of processing spreadsheets to isolate processing tasks disclosed herein may include: receiving a spreadsheet having a single output worksheet configured to create associated output data; creating a first fragment including the single output worksheet; providing the first fragment to a computing device of a user, where the computing device is operable to access a plurality of second fragments; receiving a selection of a second fragment from the plurality of second fragments, the second fragment configured to create associated second output data, the second fragment including (i) a second output worksheet and (ii) one or more transient worksheets and input worksheets that are used to create the associated second output data for the second output worksheet; creating a first processing task including using the first fragment to create the associated output data; and, in response to the selection, creating a second processing task. The second processing task may include: providing the associated output data created by the first fragment; utilizing the associated output data created by the first fragment as input data to the one or more transient worksheets and input worksheets of the second fragment; and creating the associated second output data, by the second fragment.

In an aspect, a method of fragmenting spreadsheets disclosed herein may include: receiving one or more spreadsheets collectively including one or more worksheets; identifying a first collection of one or more cells including output data within the one or more worksheets; determining, for the output data, which one or more cells within the one or more worksheets is used to create the output data using input data, and identifying the one or more cells used to create the output data as a second collection of one or more cells; identifying a third collection of one or more cells including the input data used by the second collection of one or more cells to create the output data; and creating a first fragment including the first collection of one or more cells, the second collection of one or more cells, and the third collection of one or more cells.

Implementations may include one or more of the following features. The method may further include providing the first fragment on a display of a computing device. Identifying the one or more cells may include labeling the one or more cells on the display. Labeling the one or more cells may include assigning the one or more cells to at least one of the first collection of one or more cells, the second collection of one or more cells, and the third collection of one or more cells. The first collection of one or more cells, the second collection of one or more cells, and the third collection of one or more cells may be identified within a first spreadsheet of the one or more spreadsheets. At least two of the first collection of one or more cells, the second collection of one or more cells, and the third collection of one or more cells may be identified within a first worksheet of the first spreadsheet. One of the first collection of one or more cells, the second collection of one or more cells, and the third collection of one or more cells may be identified within a first spreadsheet of the one or more spreadsheets and another of the first collection of one or more cells, the second collection of one or more cells, and the third collection of one or more cells may be identified within a second spreadsheet of the one or more spreadsheets. The method may further include receiving a selection of a component of the first fragment, the component including one or more of the first collection of one or more cells, the second collection of one or more cells, and the third collection of one or more cells contained within the first fragment. The method may further include, in response to the selection, creating a processing task that includes the first fragment. The method may further include receiving an input and processing the input according to the processing task. The method may further include evaluating an associated processing demand for the processing task. The method may further include evaluating one or more processors and using the evaluation of the one or more processors in combination with the evaluation of the associated processing demand as bases for distributing the first fragment one of the one or more processors. The method may further include providing the first fragment on a display of a computing device. The method may further include displaying, upon selection of at least a portion of the first fragment by a user of the computing device, a relationship between the first collection of one or more cells, the second collection of one or more cells, and the third collection of one or more cells.

In an aspect, a computer program product for fragmenting spreadsheets disclosed herein may include computer executable code embodied in a non-transitory computer readable medium that, when executing on one or more computing devices, performs the steps of: receiving one or more spreadsheets collectively including one or more worksheets; identifying a first collection of one or more cells including output data within the one or more worksheets; determining, for the output data, which one or more cells within the one or more worksheets is used to create the output data using input data, and identifying the one or more cells used to create the output data as a second collection of one or more cells; identifying a third collection of one or more cells including the input data used by the second collection of one or more cells to create the output data; and creating a first fragment including the first collection of one or more cells, the second collection of one or more cells, and the third collection of one or more cells.

In an aspect, a system for fragmenting spreadsheets disclosed herein may include: a data network; a user device coupled to the data network; and a remote computing resource coupled to the data network and accessible to the user device through the data network, the remote computing resource including a processor and a memory. The memory may store code executable by the processor to perform the steps of: receiving, over the data network, one or more spreadsheets collectively including one or more worksheets; identifying a first collection of one or more cells including output data within the one or more worksheets; determining, for the output data, which one or more cells within the one or more worksheets is used to create the output data using input data, and identifying the one or more cells used to create the output data as a second collection of one or more cells; identifying a third collection of one or more cells including the input data used by the second collection of one or more cells to create the output data; and creating a first fragment including the first collection of one or more cells, the second collection of one or more cells, and the third collection of one or more cells.

These and other features, aspects, and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
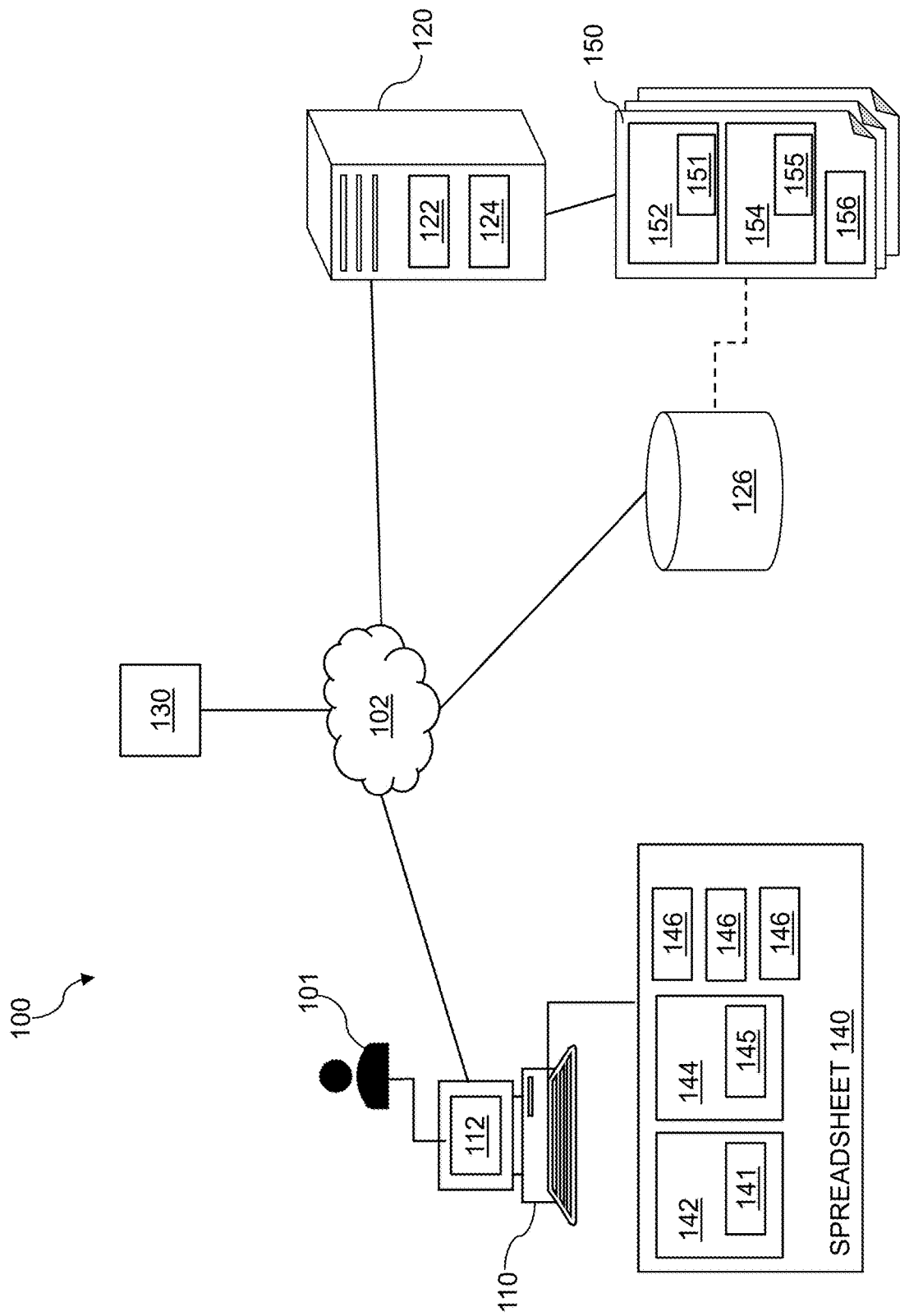
FIG. 1 illustrates a system for fragmenting spreadsheets, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

In general, the devices, systems, and methods disclosed herein relate to various processing operations involving spreadsheets, typically at a worksheet level. More specifically, the devices, systems, and methods disclosed herein may relate to the fragmenting of spreadsheets (or portions thereof), which may include decomposing a spreadsheet into smaller spreadsheets/processing tasks referred to herein as "fragments." In general, a spreadsheet may include one or more input worksheets, output worksheets, and transient worksheets, where the transient worksheets generally utilize input data in the input worksheets to facilitate the creation of certain output data in the output worksheets. Part of the fragmenting process may include understanding the relationships and/or dependencies between these various worksheets, e.g., for decomposing a spreadsheet into these smaller fragments. In this manner, fragmenting a spreadsheet may include determining, for each output worksheet, what input and transient worksheets are needed to create output data in the output worksheet (if any), and then creating one or more fragments therefrom. Thus, fragmenting a spreadsheet may include a temporal and/or physical decoupling of the spreadsheet's worksheets. As explained herein, this can be useful for, inter alia, understanding the relationships between a plurality of worksheets, isolating certain processing tasks, and/or for improving computational performance, e.g., by routing particular fragments to appropriate computational resources for processing thereof.

A "fragment" as described herein may include at least a worksheet of a spreadsheet containing a plurality of worksheets, where it will be understood that a "worksheet" generally includes a collection of one or more cells (e.g., a collection of columns and/or rows) that can be referenced as a unit (see, e.g., the "additional embodiments" described below). More particularly, a fragment may include at least a target worksheet and one or more source worksheets that are related to—e.g., direct precedents of—the target worksheet. Thus, in certain aspects, there may be as many fragments as there are worksheets for a particular spreadsheet. And, in most aspects, a fragment includes at least one output worksheet, as well as any input or transient worksheets that are used to generate the output data that is included in the output worksheet. In this manner, in certain aspects, there can be as many fragments as there are output worksheets for any particular spreadsheet (or collection of spreadsheets).

The process for creating a fragment according to the present teachings may include identifying an output worksheet, determining which one or more transient worksheets are used to create output data within that output worksheet, determining which one or more input worksheets are used by the transient worksheet(s) to create the output data within the output worksheet, and then creating a fragment consisting of the output worksheet, the aforementioned one or more transient worksheets that are used to create output data within that output worksheet, and the aforementioned one or more input worksheets that are used by those transient worksheets to create the output data within the output worksheet. In this manner, a fragment according to the present teachings includes only the portions of a spreadsheet needed to perform a particular processing task, e.g., to generate certain output included in an output worksheet. In some aspects, a fragment may solely consist of an output worksheet—e.g., when there are no input or transient worksheets needed to perform a certain processing task.

In certain aspects, when a spreadsheet is decomposed into its smaller fragments, computational tasks may proceed even if all of the required input and/or transient worksheets are not made available at once. Moreover, each fragment may be processed on different computational devices, and/or at different times, e.g., with the resulting output of each processing task later assembled to produce the final expected output of the original spreadsheet. In this manner, such a decomposition of a spreadsheet into fragments may allow for the temporal and/or physical decoupling of worksheets, or processing tasks, of the spreadsheet. This can provide several advantages that will be apparent to a skilled artisan. By way of example, fragmenting a spreadsheet may provide for an ease in understanding the content and/or operations of the spreadsheet. This can be accomplished by displaying one or more fragments to a user, where a user will be able to observe the relationships between worksheets by viewing the fragments or portions thereof. By way of example, when designing a spreadsheet, fragments can make the functionality of aspects of the spreadsheet easier to understand when a developer is able to view only certain, relevant worksheets. By way of further example, fragmenting a spreadsheet can yield improvements in processing performance. For example, in this context, when processing large numbers of spreadsheets, opportunities to batch similar fragments can allow for the routing of fragments to appropriately-sized, and/or appropriately available, computational resources—whether considering memory or CPU resources, this can prove to be advantageous. Moreover, repeated use of a particular fragment in a larger processing task may be more likely than repeated use of a spreadsheet, due to the reduction in size and input surface area.

By way of example, a spreadsheet may contain data and processing tasks related to an order management system, which can be relatively complicated and extensive. That is, a spreadsheet related to an order management system may contain all necessary information and actions that perform all backend order-related tasks for a system or company. In this manner, the spreadsheet may include a relatively large number of worksheets including input worksheets having input data, output worksheets having output data, and transient worksheets that utilize certain input data from one or more input worksheets to facilitate the creation of certain output data in one or more output worksheets. As explained above, when a spreadsheet includes an entire order management system (or the like), there may be a relatively large number of such worksheets contained therein. In this example, if only certain information or processing is needed—e.g., to ascertain the availability of a certain item for shipping and/or delays related thereto—it would be helpful to be able to isolate this data and/or processing tasks related thereto, instead of navigating a complicated spreadsheet and/or performing unnecessary computational operations and/or other processing tasks. Fragmenting the spreadsheet can present a solution by breaking the spreadsheet down into its constituent parts, e.g., by allowing a user to utilize only the necessary (or desired) parts of the spreadsheet when performing an action such as checking the availability of a certain item for shipping. Also, if a user wanted to look beyond the necessary parts (e.g., worksheets or a portion thereof), that would be useful as well, and can be accomplished via fragmenting as per embodiments of the present teachings. Furthering this example, if a user wanted to see all of the worksheets that reference a particular item (e.g., an order number or the like), one could do so by uncovering the fragment(s) that contain or otherwise relate to that particular item using an embodiment of the present teachings.

In some aspects, fragmenting may be used to accomplish partial processing of a spreadsheet, such as where the data required for complete processing may be only partially available at the time of initial processing. For example, an order management system may have data available to process an item availability from inventory, check and determine a shipping time and/or cost, and the like, but may be missing some required input data to complete an order for the item (e.g., the billing information required to complete the order processing may be incomplete). In this example, all processing that does not require the missing information (the billing information in this example) may be done using fragments, where one or more fragments may be saved for later processing when all required inputs are available. These may be partial fragments. The present teachings may thus include determining the presence of required input data needed to create the associated output data for each of a plurality of fragments. If it is determined that the required input data is present, processing of the fragment may be facilitated (e.g., the fragment may be distributed to a processor and/or scheduled for processing in a batch or the like). If it is determined that at least some of the required input data is not present, the fragment may be saved, and processing of the fragment may be delayed until a later time (e.g., a time when it is determined that required input data is available). In some cases, a fragment itself and/or associated data for processing fragments (e.g., partial input data, transient data, and/or output data) may be stored for later retrieval (such as at a time when required input data for dependent fragments, or for all fragments, is available). In this way, fragmenting the spreadsheet may facilitate completion of different processing tasks as required input data for each task becomes available, allowing for faster and/or more efficient completion of the overall processing of a spreadsheet, and providing access to data from intermediate steps of a complex or interdependent process.

Thus, in this manner, the present teachings may include using fragments to enable processing to a fixed point based on known information available at a certain time, and then conducting further processing when further information is known later in time. This may be accomplished by saving fragments (e.g., partial or whole fragments; and/or saving other data) and then retrieving saved data and/or fragments for processing at a later time. This can save the time needed for processing operations and tasks, e.g., by eliminating the need to conduct preliminary processing that has already been accomplished and saved for use at a later time. By way of example, if a worksheet includes ten fragments, but input data is available for processing only eight of the ten fragments (where input data for the remaining two fragments will be available at a later time), processing of the eight fragments may be conducted and output data (or other data) related thereto may be saved for later use when the input data for the remaining two fragments becomes available. In this manner, when the input data for the remaining two fragments becomes available, there may not be a need for processing the eight fragments previously processed, but only the remaining two fragments, thus saving processing time (and/or real world time) and resources. Thus, the present teachings may include an evaluation regarding whether all inputs are available for generating certain desired output, and saving certain data for later use and/or processing when at least some of the required inputs are currently unavailable. This can provide advantages over prior art systems and techniques that typically execute only when all required inputs are available, and can enable a technique where processing is conducted as inputs become available (e.g., processing in piecemeal).

In an aspect, the present teachings may include, determining (e.g., for each of a plurality of fragments) a state of required input data for use by a transient worksheet to create associated output data, the state related to a presence or absence of all of the required input data. Upon determining, for a first fragment, that all of the required input data is present, the present teachings may include enabling processing of the first fragment; and, upon determining, for a second fragment, that all of the required input data is not present, the present teachings may include delaying processing of the second fragment until a later time. This technique may further include saving data—e.g., output data of the first fragment and/or other processed fragments (or other data related to the first fragment and/or other processed fragments), and/or saving data related to unprocessed fragments such as the second fragment. This can be useful for retrieving stored data at a later time for use when all of the required input data is available, particularly where output data from the first fragment (and/or other processed fragments) represents at least a portion of the required input data for processing unprocessed fragments. In this manner, and continuing with this example, the present teachings may include storing output data for the first fragment (and/or other processed fragments); storing data related to the second fragment (and/or other unprocessed fragments); determining, for the second fragment at the later time, that all of the required input data is present; processing the second fragment using the stored data; and retrieving the stored output data for the first fragment (e.g., for use as an input to an unprocessed fragment or the like).

The present teachings may include fragmenting for use in different contexts. For example, the present teachings may include a display or viewer configured to conveniently show a user one or more fragments, and/or one or more components thereof. For example, the present teachings may include displaying one or more fragments to a user for viewing and/or interaction. Specifically, the present teachings may include displaying one or more fragments and labeling and/or otherwise marking (e.g., via color coding or the like) constituent parts thereof and/or the relationship(s) between such constituent parts, and/or the relationship(s) between multiple fragments. The present teachings may thus provide for the selection of a fragment or portion thereof to isolate that component, and/or to understand the contents of that component, and/or to show the relationships related thereto. This can be done through highlighting, marking (e.g., coloring), emphasizing, or otherwise. Further, aspects of the present teachings can provide for the isolation of certain fragments (or components thereof) for processing and/or for the distribution of processing tasks. Thus, the present teachings may include fragmenting a spreadsheet, displaying one or more of the fragments for viewing and/or interaction by a user, describing those components and/or relationships upon selection or otherwise, creating a spreadsheet or other processing task that only includes components of interest (and/or related components), and the like—where this is all accomplished at the worksheet level of a spreadsheet (e.g., not at the cell level).

By way of example, using the present teachings, a user may be able to select a datapoint from a fragmented spreadsheet, such as a date or the like, where such selection will show the user what that date is associated with within the spreadsheet. This can be particularly useful when a spreadsheet contains identifiers—e.g., customer numbers, order numbers, and the like—especially when these are unique identifiers that only refer to one specific item, such as a customer, order, and the like. In certain aspects, selection of an item will show a user what that item is—e.g., whether it is an identifier, a field, an attribute, and so on. And, in certain aspects, the present teachings may show the relationships related thereto—e.g., what a spreadsheet is doing with a particular item or worksheet, what data is being used, what types of data an item is referencing or using, and so on.

Fragmenting a spreadsheet may also or instead be advantageous for substantially isolating, or otherwise uncoupling, certain computational or processing tasks and operations. This is because the process of fragmenting a spreadsheet may take a single executable and break it down into multiple, smaller executables. In this manner, even when certain inputs are missing—e.g., inputs relevant to computational or processing tasks for the single executable, but that may be irrelevant for other, more granular computational or processing tasks including in one or more of the smaller executables—calculations and other processing may still be performed. In this manner, fragmenting a spreadsheet may include the creation of one or more fragments, and then the processing of one or more fragments thereof independent from the entire spreadsheet. Thus, the present teachings may include performing computations or other processing tasks at the fragment level, or at least performing computations or other processing tasks at a more granular level than would otherwise be performed using the whole spreadsheet.

Fragmenting a spreadsheet may also or instead be advantageous for optimizing computational efficiency. By way of example, different fragments may be shunted to different processors or other computing resources depending on one or more factors related to the processors or other computing resources such as processing capacity, availability, performance, cost, timing, type (e.g., of computation/processing and/or type of processor or other computing resource), or otherwise, and/or based on one or more factors related to the particular fragment(s) such as the processing needs of the fragment(s). By way of example, if a worksheet includes only numbers and no text, the computation could be shunted to a graphics processing unit (GPU) instead of to a CPU, thus reaping improved performance. This can be done dynamically as the aforementioned factors (and other factors) can change over time. And, in this manner, techniques disclosed herein may include an evaluation of such factors (or other factors) for the distribution or other processing of fragments of a spreadsheet.

Some of the additional embodiments described herein provide for fragments that are created using something other than what may be commonly referred to as "worksheets," e.g., fragments that include something other than what are commonly referred to as input worksheets, output worksheets, and transient worksheets. However, it will be understood that a "worksheet" as described herein and as known in the art may generally include a group of cells (e.g., rows and/or columns of cells) that can be referenced together as a unit (e.g., by labeling the group of cells such as by naming the group). Thus, a "worksheet" as described herein and as known in the art may generally include data, formula(s), command(s), computation(s), processing task(s), and the like that are referenced in a manner such that these components can be used by other components (e.g., other worksheets sharing a similar definition, other spreadsheets, other applications, and so on).

For example, a single worksheet of a spreadsheet may include cells formed into a plurality of columns and/or rows, where some of these cells include input data, some of these cells include operations that transform the input data into output data, and some of these cells include output data. In this manner, the cells (and/or rows and/or columns) that include input data can be grouped and labeled (e.g., named) in a manner such that this group can be referenced as a unit, and this unit may form an "input worksheet" for use in fragmenting in the same or similar manner consistent with the embodiments described herein (e.g., embodiments with reference to FIGS. 1-5); the cells (and/or rows and/or columns) that include operations that transform the input data into output data can be grouped and labeled (e.g., named) in a manner such that this group can be referenced as a unit, and this unit may form a "transient worksheet" for use in fragmenting in the same or similar manner consistent with the embodiments described herein (e.g., embodiments with reference to FIGS. 1-5); and/or the cells (and/or rows and/or columns) that include output data can be grouped and labeled (e.g., named) in a manner such that this group can be referenced as a unit, and this unit may form an "output worksheet" for use in fragmenting in the same or similar manner consistent with the embodiments described herein (e.g., embodiments with reference to FIGS. 1-5).

Thus, in this manner, an "input worksheet" described herein may be part of a larger overall worksheet that also includes other input data and/or input worksheets, one or more transient worksheets, and/or one or more output worksheets; a "transient worksheet" described herein may be part of a larger overall worksheet that also includes other cells with operations that transform data and/or transient worksheets, one or more input worksheets, and/or one or more output worksheets; and an "output worksheet" described herein may be part of a larger overall worksheet that also includes other output data and/or output worksheets, one or more transient worksheets, and/or one or more input worksheets.

FIG. 1 illustrates a system for fragmenting spreadsheets, in accordance with a representative embodiment. In general, the system 100 may include a networked environment where a data network 102 interconnects a plurality of participating devices and/or users 101 in a communicating relationship. The participating devices may, for example, include any number of user devices 110, remote computing resources 120, and other resources 130.

The data network 102 may be any network(s) or internetwork(s) suitable for communicating data and information among participants in the system 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)), fifth generation (e.g., 5G), and/or other technologies, as well as any of a variety of corporate area or local area networks and other switches, routers, hubs, gateways, and the like that might be used to carry data among participants in the system 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The user devices 110 may include any devices within the system 100 operated by one or more users 101 for practicing the techniques as contemplated herein. Specifically, the user devices 110 may include any device for creating, preparing, editing, receiving, and/or transmitting (e.g., over the data network 102) a spreadsheet 140 and information related thereto such as input data 141, one or more input worksheets 142, one or more output worksheets 144, output data 145, and one or more transient worksheets 146. Similarly, the user devices 110 may include any device for creating, preparing, editing, receiving, and/or transmitting (e.g., over the data network 102) other data or files in the system 100, such as a fragment 150 as described herein. The user devices 110 may also or instead include any device for managing, monitoring, or otherwise interacting with tools, platforms, and devices included in the systems and techniques contemplated herein. The user devices 110 may be coupled to the data network 102, e.g., for interaction with one or more other participants in the system 100.

By way of example, the user devices 110 may include one or more desktop computers, laptop computers, network computers, tablets, mobile devices, portable digital assistants, messaging devices, cellular phones, smart phones, portable media or entertainment devices, or any other computing devices that can participate in the system 100 as contemplated herein. As discussed above, the user devices 110 may include any form of mobile device, such as any wireless, battery-powered device, that might be used to interact with the networked system 100. It will also be appreciated that one of the user devices 110 may coordinate related functions (e.g., processing the spreadsheet 140, evaluating the processors 122, distributing the fragments 150, and so on) as they are performed by another entity such as one of the remote computing resources 120, another of the user devices 110, or other resources 130.

Each user device 110 may generally provide a user interface (e.g., included on a display 112 thereof), such as any of the user interfaces described herein. The user interface may be maintained by a locally executing application on one of the user devices 110 that receives data from, e.g., the remote computing resources 120 or other resources 130. In other embodiments, the user interface may be remotely served and presented on one of the user devices 110, such as where a remote computing resource 120 or other resource 130 includes a web server that provides information through one or more web pages or the like that can be displayed within a web browser or similar client executing on one of the user devices 110. The user interface may in general create a suitable visual presentation for user interaction on a display 112 of one of the user devices 110, and provide for receiving any suitable form of user input including, e.g., input from a keyboard, mouse, touchpad, touch screen, hand gesture, or other user input device(s).

The remote computing resources 120 may include, or otherwise be in communication with, a processor 122 and a memory 124, where the memory 124 stores code executable by the processor 122 to perform various techniques of the present teachings. More specifically, a remote computing resource 120 may be coupled to the data network 102 and accessible to the user device 110 through the data network 102, where the remote computing resource 120 includes a processor 122 and a memory 124, where the memory 124 stores code executable by the processor 122 to perform the steps of a method according to the present teachings.

The remote computing resources 120 may also or instead include data storage, a network interface, and/or other processing circuitry. In the following description, where the functions or configuration of a remote computing resource 120 are described, this is intended to include corresponding functions or configuration (e.g., by programming) of a processor 122 of the remote computing resource 120, or in communication with the remote computing resource 120, e.g., over the data network 102 or otherwise. In general, the remote computing resources 120 (or processors 122 thereof or in communication therewith) may perform a variety of processing tasks related to the fragmenting of a spreadsheet, and/or uses thereof, as discussed herein. For example, the remote computing resources 120 may manage information received from one or more of the user devices 110, and provide related supporting functions such as: processing the spreadsheet 140; determining associations between the input worksheet(s) 142, the output worksheet(s) 144, and the transient worksheet(s) 146; creating, displaying, receiving, transmitting, and/or distributing the fragments 150; communicating with the other resources 130, storing data, and the like. The remote computing resources 120 may also or instead include backend algorithms that react to actions performed by a user 101 at one or more of the user devices 110. The backend algorithms may also or instead be located elsewhere in the system 100.

The remote computing resources 120 may also or instead include a web server or similar front end that facilitates web-based access by the user devices 110 to the capabilities of the remote computing resource 120 or other components of the system 100. A remote computing resource 120 may also or instead communicate with other resources 130 in order to obtain information for providing to a user 101 through a user interface on the user device 110. Where the user 101 specifies certain criteria for spreadsheet processing, this information may be used by a remote computing resource 120 (and any associated algorithms) to access other resources 130. Additional processing may be usefully performed in this context, such as recommending certain data processing operations and techniques.

A remote computing resource 120 may also or instead maintain, access, or otherwise be in communication with, a database 126 of content such as one or more fragments 150 and/or spreadsheets and/or other data, along with an interface for users 101 at the user devices 110 to utilize the content of such a database 126. Thus, in one aspect, a remote computing resource 120 may include a database 126 of fragments 150, and the remote computing resource 120 may act as a server that provides a platform for selecting and using a fragment 150, and/or providing supporting services and other functionality related thereto.

A remote computing resource 120 may also or instead be configured to manage access to certain content (e.g., for an enterprise associated with a user 101 of the user device 110). In one aspect, a remote computing resource 120 may manage access to a component of the system 100 by a user device 110 according to input from a user 101.

The other resources 130 may include any resources that may be usefully employed in the devices, systems, and methods as described herein. For example, the other resources 130 may include without limitation other data networks, human actors (e.g., programmers, researchers, annotators, editors, analysts, and so forth), sensors (e.g., audio or visual sensors), data mining tools, computational tools, data monitoring tools, and so forth. The other resources 130 may also or instead include any other software or hardware resources that may be usefully employed in the networked applications as contemplated herein. For example, the other resources 130 may include payment processing servers or platforms used to authorize payment for access, content or feature purchases (e.g., certain fragments 150 or other data), or otherwise. In another aspect, the other resources 130 may include certificate servers or other security resources for third-party verification of identity, encryption or decryption of data, and so forth. In another aspect, the other resources 130 may include a desktop computer or the like co-located (e.g., on the same local area network with, or directly coupled to through a serial or USB cable) with one of the user devices 110 or remote computing resources 120. In this case, the other resource 110 may provide supplemental functions for the user device 110 and/or remote computing resource 120. Other resources 130 may also or instead include supplemental resources such as scanners, cameras, printers, input devices, and so forth.

The other resources 130 may also or instead include a plurality of processors or other computational resources, e.g., where the present teachings includes the evaluation thereof (and/or an evaluation of one or more fragments 150 such as the processing demand(s) thereof) for the purpose of distributing those fragments 150 to these other resources 130 for processing.

The other resources 130 may also or instead include one or more web servers that provide web-based access to and from any of the other participants in the system 100. While depicted as a separate network entity, it will be readily appreciated that the other resources 130 (e.g., a web server) may also or instead be logically and/or physically associated with one of the other devices described herein, and may, for example, include or provide a user interface for web access to a remote computing resource 120 or a database 126 in a manner that permits user interaction through the data network 102, e.g., from a user device 110.

It will be understood that the participants in the system 100 may include any hardware or software to perform various functions as described herein. For example, one or more of the user device 110 and the other resources 130 may include one or more memories and/or one or more processors, which may be the same as or different than the memory 124 and processor 122 described above.

The various components of the networked system 100 described above may be arranged and configured to support the techniques described herein in a variety of ways. For example, in one aspect, a user device 110 connects through the data network 102 to a server (e.g., that is part of one or more of the remote computing resource 120 or other resources 130) that performs a variety of processing tasks related to fragmenting a spreadsheet. For example, the remote computing resource 120 may include a server that hosts a website that runs a platform for fragmenting a spreadsheet 140 and uses for such fragments 150. More specifically, a user 101 associated with the user device 110 and having appropriate permissions for using the system 100 may use the user device 110 to transmit a spreadsheet 140 over the data network 102 to the remote computing resource 120. The spreadsheet 140 may include a plurality of worksheets. The plurality of worksheets may include, for example, one or more input worksheets 142 including input data 141; one or more input output worksheets 144 that create output data 14; and one or more transient worksheets 146, which utilize input data 141 in one or more of the input worksheets 142 to facilitate creation of output data 145 in one or more of the output worksheets 144. The remote computing resource 120 may thus receive the spreadsheet 140 from the user 101 over the data network 102 for processing thereof. Processing the spreadsheet 140 may include determining, for an output worksheet 144 that creates output data 145, which of the one or more transient worksheets 146 is used to create the output data 145 in the output worksheet 144. Processing the spreadsheet 140 may also, or instead, include determining which of the one or more input worksheets 142 is used by the one or more transient worksheets 146 to create the output data 145 in the output worksheet 144. Processing the spreadsheet 140 may also include creating a fragment 150 including a first output worksheet 154, one or more first transient worksheets 156, and the one or more first input worksheets 152 (including first input data 151) that are used to create the first output data 155 in the first output worksheet 154.

The remote computing resource 120 may further provide the fragment 150 for display on a computing device, such as on the display 112 of the user device 110—e.g., on a user interface that is presented to the user 101 on such a display 112. More specifically, one or more fragments 150 may be displayed, and the user 101 may select at least a portion of the one or more fragments 150. A user selection of at least a portion of the one or more fragments 150 may be received anywhere in the system 100, such as locally at the user device 110, or remotely at the remote computing resource 120 or a web platform hosted by same. A portion of a fragment 150 may include one or more of: a datapoint, a column, a cell, a worksheet, a unique identifier, a field, and an attribute of the fragment.

In an aspect, many of the techniques of the present teachings are performed by the remote computing resource 120. For example, the remote computing resource 120 may include an analysis engine (or otherwise a processor 122) configured by computer-executable code to analyze and read the spreadsheet 140, e.g., to determine associations between the input worksheets 142, the output worksheets 144, and the transient worksheets 146 of the spreadsheet 140. Similarly, such an analysis engine of the remote computing resource 120 may fragment the spreadsheet 140, such as in accordance with the determined associations between input, output, and transient worksheets. The output of an analysis engine of the remote computing resource 120 may thus include one or more fragments 150 that can be read and executed by any computing resource of the system 100. The analysis engine may further evaluate an associated processing demand for each of the plurality of fragments 150. The system 100 may include a plurality of processors, and each of the plurality of fragments 150 may be distributed to one of the plurality of processors based on the evaluation of the processing demand determined for the fragment. Evaluation of the one or more processors may include an evaluation of at least one of the following: an availability of the one or more processors; a processing capability of the one or more processors; a processing cost associated with the one or more processors; or a processing time associated with using the one or more processors. The evaluation of the processors may be performed by the user device 110, the remote computing resource 120, or the other resources 130. Similarly, the processing demand for the fragments 150 may be determined by the user device 110, the remote computing resource 120, or the other resources 130. Evaluation of the processors and processing demand for the fragments 150 may be communicated between system resources to facilitate distributing each of the plurality of fragments 150 to the one or more processors 122.

Figure 2:
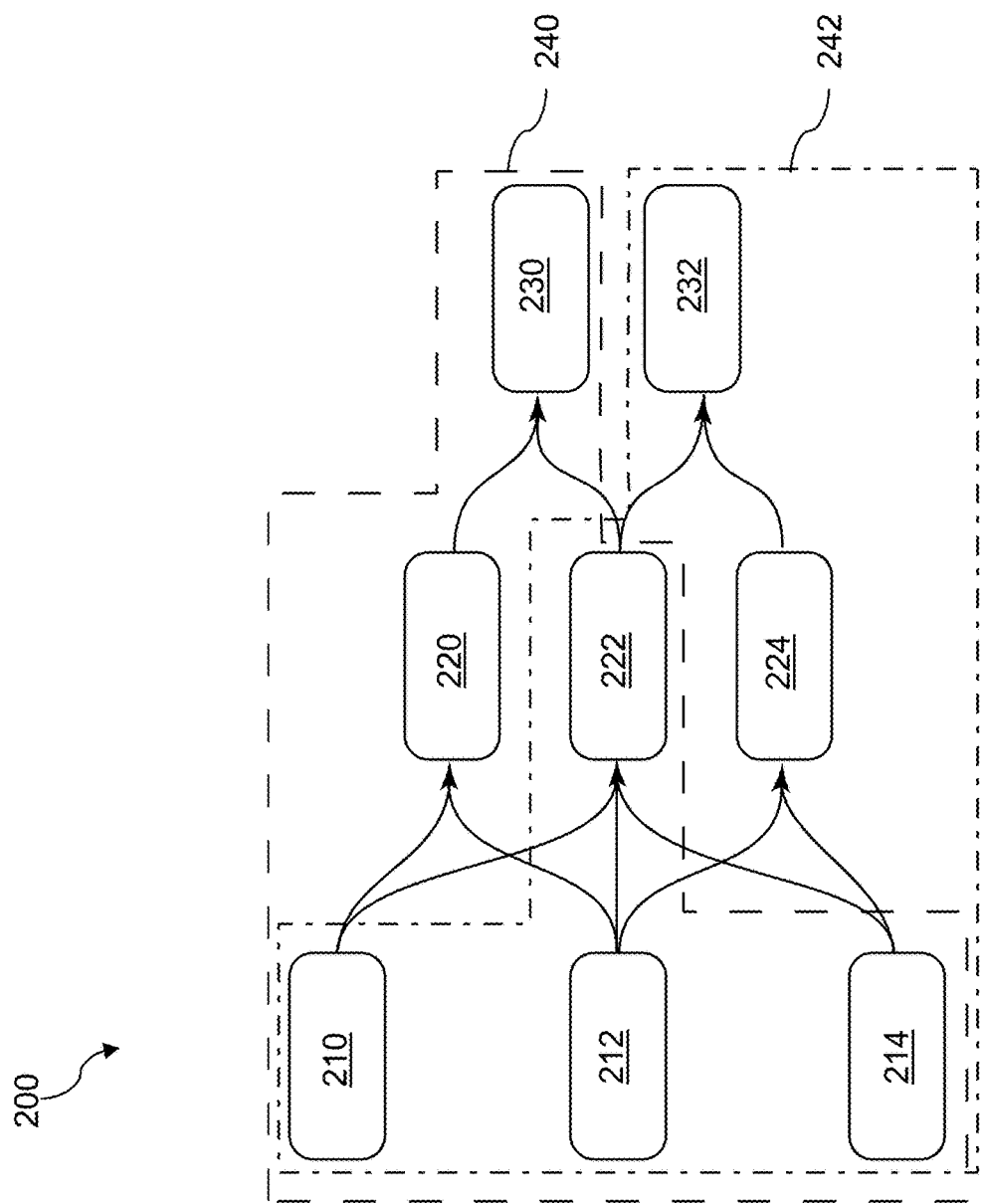
FIG. 2 illustrates a workflow oriented display of fragments created from a spreadsheet, in accordance with a representative embodiment.

An example of the present teachings is provided below with reference to FIG. 2. In particular, FIG. 2 illustrates a display of fragments created from a spreadsheet, in accordance with a representative embodiment. The embodiment of FIG. 2 may include any of the features described with reference to the system 100 of FIG. 1, and vice-versa.

Specifically, FIG. 2 illustrates a spreadsheet 200 in representative form that includes one or more input worksheets (e.g., input worksheets 210, 212, 214), one or more transient worksheets (e.g., transient worksheets 220, 222, 224), and one or more output worksheets (e.g., output worksheets 230, 232). A relationship between one or more worksheets is indicated in the figure in representative form by one or more arrows connecting the related worksheets to one another. For example, input worksheet 210 has a relationship with transient worksheets 220 and 222 (e.g., transient worksheets 220 and 222 may utilize input data in input worksheet 210). Transient worksheets 220 and 222 as shown each have a relationship with output worksheet 230 (e.g., transient worksheets 220 and 222 may each be used to create output data in output worksheet 230). Transient worksheet 222 may also have a relationship with another output worksheet, such as output worksheet 232.

In the example of FIG. 2, two fragments that may be created from the spreadsheet 200 are indicated—specifically, fragment 240 is indicated by a dashed line and fragment 242 is indicated by a dot-dash line. Each of the fragments shown includes one particular output worksheet from among the plurality of output worksheets in spreadsheet 200, as well as the one or more transient worksheets and input worksheets that have a relationship to (e.g., are used to create the associated output data for) the particular output worksheet. In this example, fragment 240 includes input worksheets 210, 212, and 214, transient worksheets 220 and 222, and output worksheet 230. Fragment 242 includes input worksheets 210, 212, and 214, transient worksheets 222 and 224, and output worksheet 232.

In the shown example, a plurality of fragments are provided including a fragment for each of the plurality of output worksheets; said another way, fragmenting of the spreadsheet 200 is repeated for all of the output worksheets 230 and 232 of the spreadsheet 200 to create the plurality of fragments 240 and 242. In other cases, more or fewer fragments may be provided. For example, multiple fragments may be created for some or all of the output worksheets, or a fragment may not be created for some of the output worksheets. In another example, a fragment may be created for each worksheet within a spreadsheet. Some fragments may not include an output worksheet, for example a fragment may include only transient worksheet 220 and the input worksheets 210 and 212 which are related to the transient worksheet 220. Some fragments may not include an input worksheet, for example a fragment may include only output worksheet 232 and the transient worksheets 222 and 224 which are related to the output worksheet 232. Some fragments may only include an output worksheet, and nothing more. Further, it should be noted that a fragment created in the manner defined in this example could be saved as a spreadsheet, and as such, the transient worksheet could then be considered an output worksheet within the context of this created fragment. In this manner, the labels 'input,' 'transient,' and 'output' may be relative to the fragment under consideration.

A representation of the spreadsheet 200 similar to that provided in FIG. 2 may be provided on the display of a computing device. This type of representation may be referred to as a workflow oriented view and may be optimized for workflow design. A user may be able to select a portion of the workflow view, such as a worksheet or a fragment, and may be presented with another view of a limited portion of the workflow based on the selection. More specifically, selection of a worksheet within the spreadsheet 200 on the display may show a user the fragments that contain that particular selected worksheet; or, stated otherwise, the selection may show the other worksheets that are related to the selected worksheet. Further, specific types of worksheets and/or specific portions of fragments may be color-coded or otherwise labeled and/or marked so that a user can identify, e.g., the type of worksheet, the type of data included therein, the type of processing task the fragment or worksheet can be used for, and so on. Moreover, a user may be able to utilize a selected component of the workflow view, e.g., for performing a certain processing task performed by a certain fragment.

User interaction with a fragment, and uses thereof, may be diverse. For example, a user may choose to provide input data for the given fragment and execute only that fragment in the workflow (without allowing execution to progress to downstream or dependent fragments in the workflow). Fragment-based tooling may also or instead allow users to generate a variety of input for only those fragments the user chooses in order to more thoroughly test, evaluate, or demonstrate the execution of a fragment. Users may also or instead extract a fragment from a current workflow and use it to create another workflow, and/or add it to another existing workflow. Users may also or instead export a fragment as a standalone spreadsheet and send that spreadsheet to other users to use independently of the existing workflow. Other examples are also or instead possible as will be understood by skilled artisans.

Figure 3:
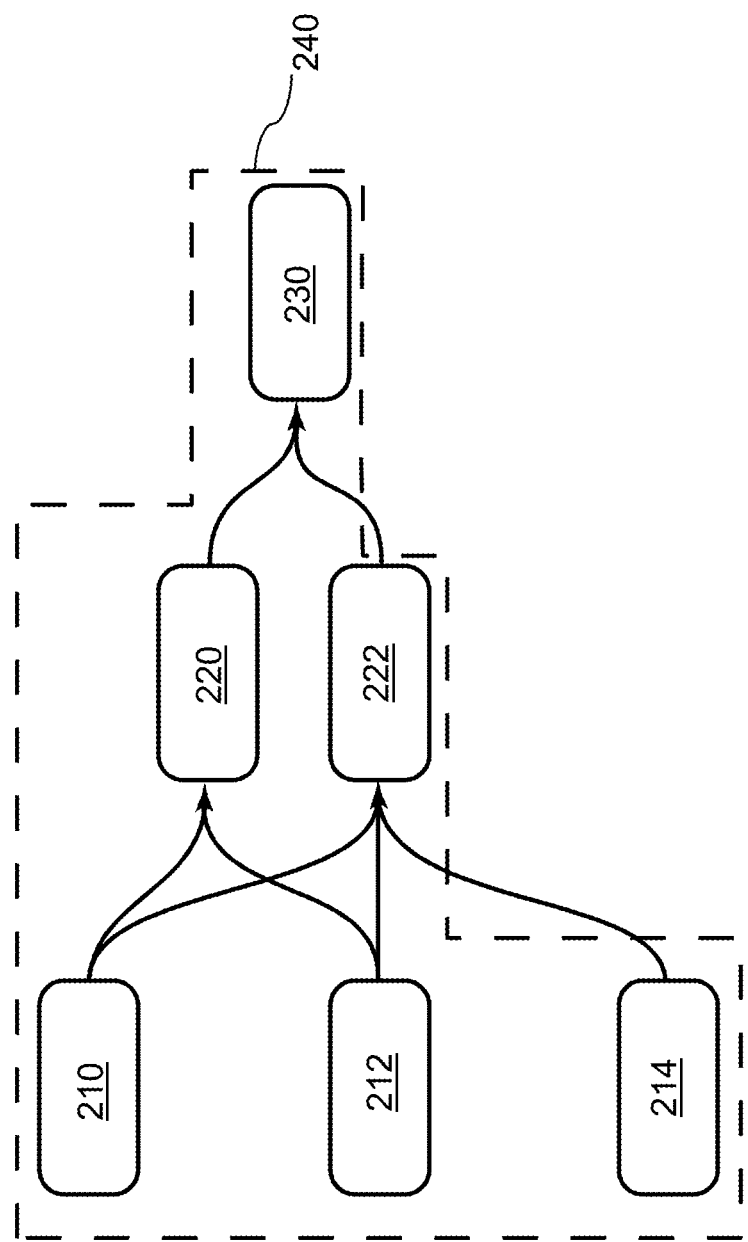
FIG. 3 illustrates a workflow oriented display of a fragment, in accordance with a representative embodiment.

FIG. 3 illustrates a workflow oriented display of a fragment, where reference numbers are as described in FIG. 2. In an example use case, a user may be presented with a representation of a spreadsheet as shown in FIG. 2. The user may select a portion of the spreadsheet, in this case the fragment 240. In response to the selection, the present teachings may display the portion of the spreadsheet shown in FIG. 3. This portion of the spreadsheet includes the selected component (e.g., the fragment 240) and each component of the spreadsheet that is related to the selected component. The components related to the fragment 240 may include, for example: the input worksheets 210, 212, and 214; the transient worksheets 220 and 222; and the output worksheet 230.

Figure 4:
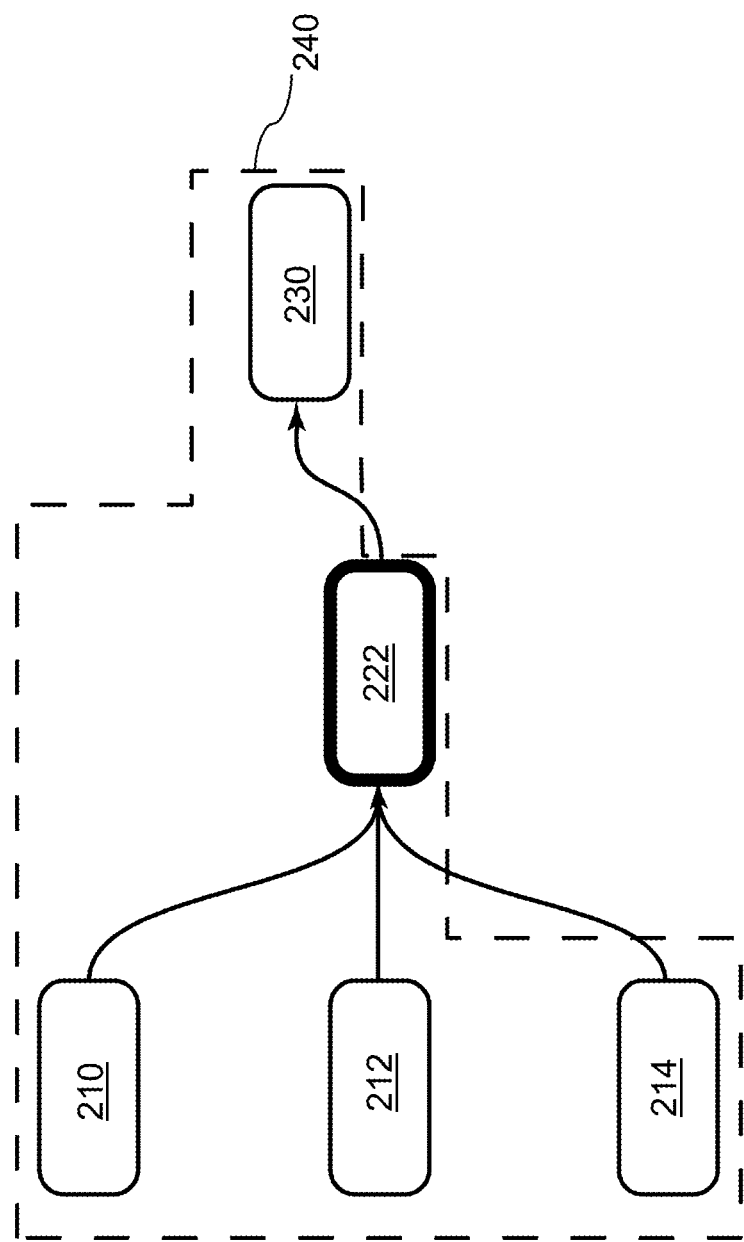
FIG. 4 illustrates a workflow oriented display of a worksheet, in accordance with a representative embodiment.

FIG. 4 illustrates a workflow oriented display of a worksheet, where reference numbers are as described in FIG. 2. Specifically, the shown workflow illustrates relationships within the fragment 240 to one of the components of the fragment 240—i.e., the transient worksheet 222 (indicated in bold outline, where it will be understood that other markings and/or labeling and/or colorizing or similar may be provided to indicate a selection). In this example use case, a user may select the transient worksheet 222 when presented with a representation of the fragment 240, for example as shown in FIG. 3. In response to the selection, the system may display the selected component (e.g., the transient worksheet 222), and may also display components of the fragment 240 that are related to the selected component. In this example, components of the fragment 240 that are related to the transient worksheet 222 include the input worksheets 210, 212, and 214, and the output worksheet 230. In other embodiments, the system may display only a portion of the components of the fragment 240 that are related to the selected component, e.g., for a selected transient worksheet, only related input worksheets or only related output worksheets may be displayed.

Referring again to FIG. 2, in another example use case, a user may select the transient worksheet 222 when presented with a representation of the spreadsheet 200. In response to selecting the transient worksheet 222 from the display of FIG. 2, the system may display all components within the spreadsheet 200 that are related to the transient worksheet 222. In this example, components of the spreadsheet 200 that are related to the transient worksheet 222 include: the input worksheets 210, 212, and 214; and the output worksheets 230 and 232 (in other words, all of the components of the transient worksheet 222 that are displayed as connected to the transient worksheet 222).

In some embodiments, and as discussed herein, the components of each of the fragments 240, 242 may be labeled or otherwise marked on the display. Labeling the components may include marking the components by type (e.g., as an input worksheet, a transient worksheet, and/or an output worksheet). For example, components may be assigned a color based on type, such as a green label assigned to input worksheet(s), a blue label assigned to transient worksheet(s), and a yellow label assigned to output worksheet(s). Other color configurations are also or instead possible, as well as other markings/labeling as will be understood by a skilled artisan.

Spreadsheet components and/or fragment components may be displayed in formats other than the workflow oriented views of FIGS. 2-4. For example, a data entity oriented view may display data definition information, such as primary keys, foreign keys, unique keys, and composite key relationships. A data entity oriented view may also or instead include spreadsheet columns and relationships between them. The data entity oriented view may be styled similarly to a bar chart. Another example of a display format may be a spreadsheet oriented view. The spreadsheet oriented view may display all or a portion of the worksheets of a fragment, an individual worksheet, or the worksheets of multiple related fragments.

Figure 5:
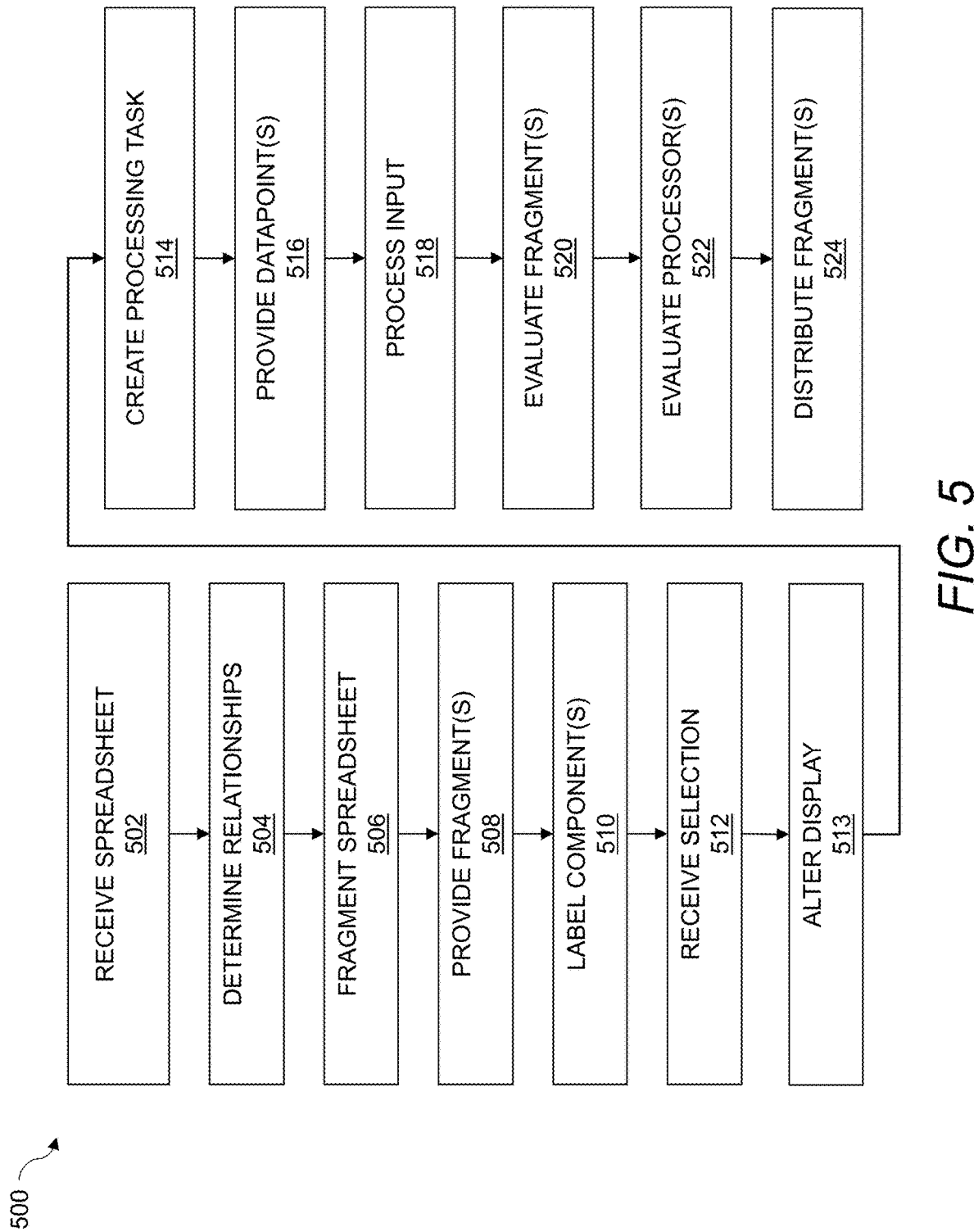
FIG. 5 is a flow chart of a method for fragmenting spreadsheets, in accordance with a representative embodiment.

FIG. 5 is a flow chart of a method for fragmenting spreadsheets, in accordance with a representative embodiment. The method 500 may utilize any of the systems or platforms described herein, e.g., the system 100 described with reference to FIG. 1. In general, the method 500 represents a technique for processing spreadsheets by fragmenting the spreadsheets at a worksheet level, enabling isolation of one or more processing tasks performed by the spreadsheet into fragments. These fragments may advantageously be displayed to a user for interaction and understanding of a spreadsheet, may be executed as independent processes, and/or multiple fragments from a spreadsheet may be distributed between multiple processors. The method 500 thus may allow for improved visualization of spreadsheet functionality, as well as improved processing efficiency. Stated otherwise, the method 500 may be used to: display one or more fragments for selection by a user; isolate processing tasks of a spreadsheet; and/or process a spreadsheet to enhance computational efficiency.

As shown in step 502, the method 500 may include receiving a spreadsheet. For example, a spreadsheet may be received by a remote computing resource (e.g., the remote computing resource 120 of FIG. 1), such as via a network upload performed by a user. The spreadsheet may have a plurality of worksheets, including a combination of one or more input worksheets, output worksheets, and/or transient worksheets, as discussed herein. That is, the transient worksheets may utilize input data in one or more of the input worksheets to facilitate creation of output data in one or more of the output worksheets.

As shown in step 504, the method 500 may include determining relationships between worksheets, e.g., as described with reference to FIG. 2. This step may be best understood by way of example. In an example use case similar to one provided above, the spreadsheet may relate to an order management system. A first worksheet may contain inventory data, and may be considered a first input worksheet. A first transient worksheet may use input data from the first input worksheet (e.g., at least part of the inventory data) to compute product availability. The method 500 may thus include identifying that the first transient worksheet is related to the first input worksheet. Further, a first output worksheet may contain first output data, such as product availability dates. The first transient worksheet may be used to create the output data, and the method 500 may thus include identifying that the first transient worksheet is related to the first output worksheet. The method 500 may also determine that the first input worksheet is related to the first output worksheet, by virtue of the relationship between the first input worksheet and the first transient worksheet. Determination of relationships may be performed by any participating devices of a system as described herein, for example, the user device 110, remote computing resources 120, and other resources 130 with reference to FIG. 1.

Turning back to the method 500 of FIG. 5, determining relationships may thus include determining, for a first output worksheet that creates first output data, which one or more first transient worksheets is used to create the first output data in the first output worksheet, and which one or more first input worksheets is used by these first transient worksheets to create the first output data in the first output worksheet. This determination may be done for any output worksheet included in a given spreadsheet, and in some cases for every output worksheet in the given spreadsheet. Thus, the method 500 may include determining, for each of a plurality of output worksheets that each create associated output data, which one or more transient worksheets is used to create the associated output data, and which one or more input worksheets is used by these transient worksheets to create the associated output data. This determination may instead be done for every worksheet included in a given spreadsheet, i.e., output worksheet or otherwise.

As shown in step 506, the method 500 may include fragmenting the spreadsheet to create a fragment as described in detail herein. In the present example, a first fragment may be created that includes the first output worksheet, the first transient worksheet, the first input worksheet, and any other transient worksheets or input worksheets that are used to create the first output data. In some instances, a first fragment may consist only of the first output worksheet, one or more first transient worksheets, and one or more first input worksheets that are used to create the first output data. In other aspects, a first fragment may consist only of an output worksheet.

In some cases, where a plurality of output worksheets are present in the spreadsheet, the spreadsheet may be fragmented repeatedly, for example, to create at least one fragment for each of a plurality of output worksheets contained in the spreadsheet. That is, the method 500 may include creating, for each of the plurality of output worksheets, a fragment including (e.g., consisting only of): (i) a particular output worksheet of the plurality of output worksheets, and (ii) one or more transient worksheets and input worksheets that are used to create the associated output data for the particular output worksheet, thereby providing a plurality of fragments including a fragment for each of the plurality of output worksheets. Stated otherwise, the method 500 may include repeating the fragmenting of the spreadsheet for a plurality of output worksheets contained in the spreadsheet to create a plurality of fragments including the first fragment. This may be repeated for all of the output worksheets of the spreadsheet to create the plurality of fragments.

As shown in step 508, the method 500 may include providing one or more fragments (e.g., the first fragment) on a display of a computing device (e.g., the display 112 of the user device 110 of FIG. 1). In some instances, the method 500 may include providing a plurality of fragments to a computing device of a user for display and selection of at least a portion of the plurality of fragments by the user. Displaying a fragment is further described with reference to FIGS. 2-4 above.

As shown in step 510, the method 500 may include labeling components of the fragments. This step 510 may include displaying the labels on a computing device of a system according to the present teachings. In one example, any input worksheets of the first fragment, including the first input worksheet, may be labeled with a certain color (e.g., blue) such as with a colored outline, background, and/or tab. Any transient worksheets of the first fragment, including the first transient worksheet, may be similarly labeled with a different color (e.g., orange), and any output worksheets of the first fragment, including the first output worksheet, may be labeled with yet another different color (e.g., purple). Stated otherwise, labeling components may include marking the components by type, where such marking of the components by type may include assigning a color to components based on type. Other types of labeling (e.g., not depending on color) are also or instead possible, as will be understood by a skilled artisan.

As shown in step 512, the method 500 may include receiving a selection, (e.g., a user may input a selection into a user device included in a system according to the present teachings). The selection may include a component of at least one fragment of the plurality of fragments created. The selected component may include one or more of an input worksheet, a transient worksheet, and an output worksheet contained within any of the plurality of fragments.

As shown in step 513, the method 500 may include altering a display according to the selection. For example, the method 500 may include displaying, upon selection of at least a portion of the first fragment by a user of the computing device, a relationship between the first output worksheet, the first transient worksheet(s), and the first input worksheet(s) that are used to create the first output data. In certain aspects, relationships between components of each of the plurality of fragments may be displayed by connecting related components to one another. Also or instead, in response to the selection, the method 500 may include displaying each component of at least one fragment that is related to the selected component. Also or instead, in response to the selection, the method 500 may include creating a processing task that includes at least a portion of the selected component or fragment. Additionally, as explained in more detail below, creating a processing task may include creating a spreadsheet that includes (e.g., consists solely of) components of the selected fragment.

As shown in step 514, the method 500 may include creating a processing task that includes at least one fragment (e.g., in response to the selection creating a processing task that includes the selected component(s)). In the example provided above regarding the order management system, the processing task may include the first fragment and may involve computing product availability and providing product availability dates. This processing task may be one, or a subset, from among many processing tasks included in the spreadsheet. Creating the processing task may also or instead include creating a spreadsheet, which may be distinct from the spreadsheet received in step 502, and which may include components of the fragment. For example, a first fragment spreadsheet may be created including the first input worksheet, the first transient worksheet, and the first output worksheet. In some cases, the first fragment spreadsheet may have worksheets that only include components of the first fragment. In some cases, the first fragment spreadsheet may include more or fewer worksheets than the number of worksheets used to create the first fragment spreadsheet (e.g., cells from each of a first input worksheet, a first transient worksheet, and a first output worksheet may be appended to one another to create a single worksheet of the first fragment spreadsheet). In other cases, other information may be included in the first fragment spreadsheet. And, in some implementations, the processing task includes (e.g., consists solely of) the selected fragment and input data.

As shown in step 516, the method 500 may include providing one or more datapoints, for example, on the display of a computing device. Each of the datapoints may be associated with one or more components of a fragment—e.g., a datapoint may include one or more of a unique identifier and a field or attribute in a worksheet of the received and fragmented spreadsheet. For example, the first fragment may include a first output worksheet that has multiple datapoints (e.g., the product availability dates in the example provided above regarding the order management system). These datapoints may be displayed to a user, and a user may optionally select one or more of the datapoint(s), whereupon information related to the selected datapoint(s) may be displayed. In some cases, in response to a selection of a datapoint, the system may display components of the fragments that are associated with the selected datapoint. In some cases, the system may display additional information about a datapoint, such as a data format, a unique identifier, or another attribute of the datapoint.

The datapoints themselves may represent columns, or other collections of cells, in a worksheet of the spreadsheet upon which the fragment was created. That is, columns may be defined by column name (e.g., order-id, first-name, age), position (e.g., first, second, last), value (e.g., 55.0, true, "Saturn"), and type (e.g., integer, date, string).

As shown in step 518, the method 500 may include receiving an input from a user and processing the input according to the processing task. In certain implementations, only the processing task related to a single selected fragment is performed to process the input, in the absence of other processing tasks associated with the spreadsheet. Thus, the processing task may be performed in isolation relative to other processing tasks associated with the spreadsheet.

As shown in step 520, the method 500 may include evaluating an associated processing demand for each of the plurality of fragments that are created, or a subset thereof. The processing demand associated with a fragment may depend upon factors such as, for example, quantity or type of data contained therein; quantity or type or worksheets contained therein; and/or the nature of computations performed within the worksheets thereof.

As shown in step 522, the method 500 may include evaluating one or more processors of a plurality of processors. The evaluation of these processors may be used in combination with the evaluation of the associated processing demand of a fragment as bases for distributing each of the plurality of fragments to the processors as explained below with reference to step 524. The evaluation of the processors may include at least one of an availability of the one or more processors and a processing capability of the processors. The evaluation of the processors may also or instead include a processing cost associated with the processors. The evaluation of the processors may also or instead include a processing time associated with using the processors.

As shown in step 524, the method 500 may include, based on the evaluation of the associated processing demand of a fragment and/or the evaluation of a processor, distributing one or more of the plurality of fragments to a processor of a plurality of processors. By way of example, fragments having a processing demand greater than a predetermined threshold may be distributed to one or more processors of a first type, and fragments having a processing demand less than the predetermined threshold may be distributed to one or more processors of a second type. It will be understood that the first and second "type" of processors referred to in this context may be directed toward processors that are the same or similar, but they are simply different components; also or instead, the first and second "type" of processors may have a different bandwidth, capacity, cost, availability, etc. More generally, the method 500 may involve performing computation complexity checks on the fragment and measuring the amount of input data to estimate the size of a computation request; and, once the size is determined, the method 500 may involve sending the request to a selected processor from a variable amount of processing power groups.

It will be understood that one or more of the steps of the above-recited method 500, or any of the methods and techniques described herein, may be performed on a system—e.g., the system 100 of FIG. 1. It will also be understood that one or more of the steps of the above-recited method 500, or any of the methods and techniques described herein, may be performed using a computer program product comprising computer executable code embodied in a non-transitory computer readable medium that, when executing on one or more computing devices, performs the steps of the method 500 (or any other steps of any of the methods and techniques described herein).

Figure 6:
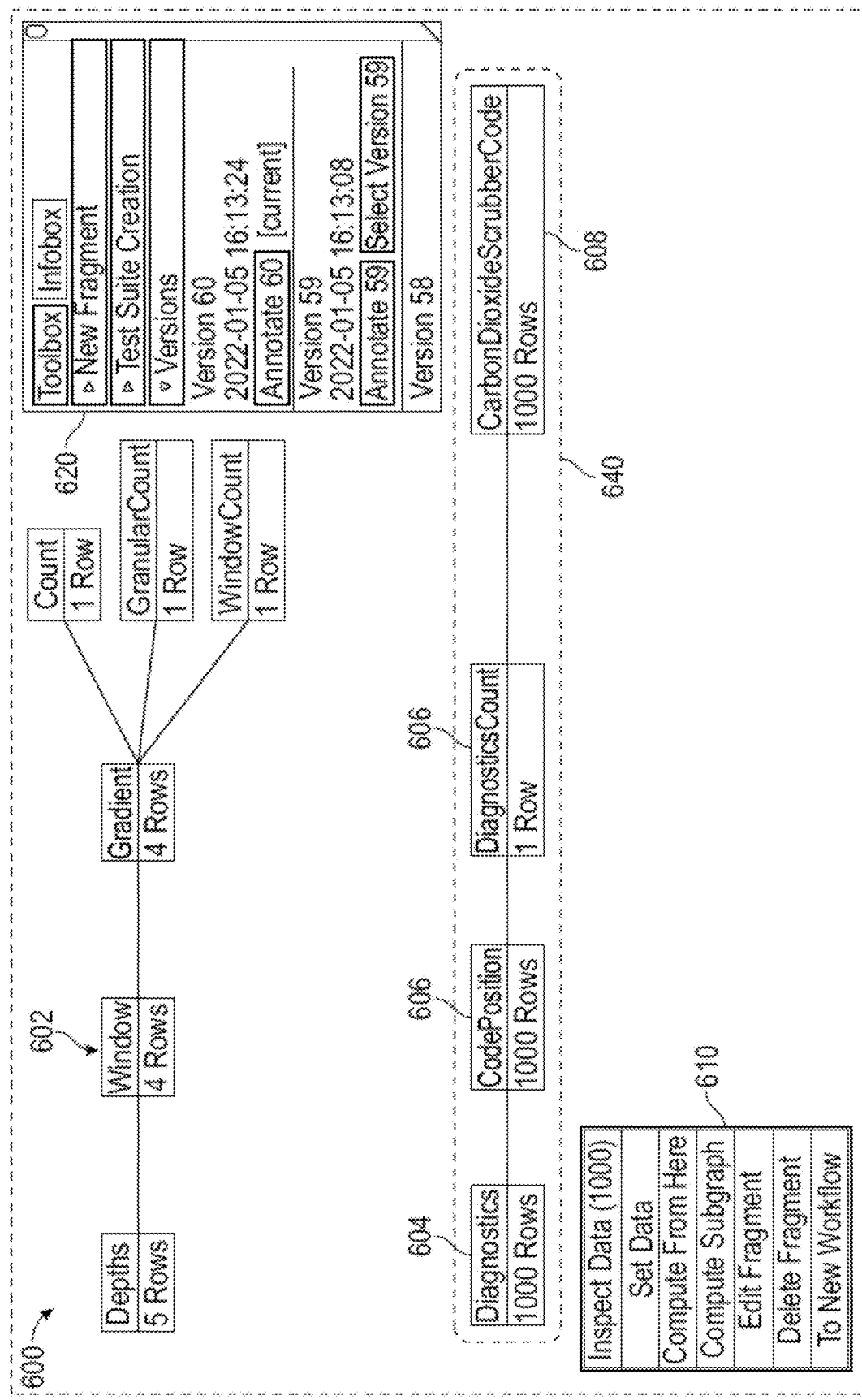
FIG. 6 illustrates a data entity oriented display of a spreadsheet, in accordance with a representative embodiment.

FIG. 6 illustrates a data entity oriented display of a spreadsheet, in accordance with a representative embodiment. Specifically, FIG. 6 illustrates a spreadsheet 600 in representative form that includes worksheets or collections of one or more cells (e.g., portions of worksheets) displayed as nodes 602 (e.g., "Depths" including 5 rows; "Window" including 4 rows; etc.). In this manner, the spreadsheet 600 is presented as including certain data by way of example in understanding an aspect of the present teachings, and more particularly for how a spreadsheet 600 may be displayed for a user for interaction. Nodes 602 may represent input worksheets (e.g., an input worksheet 604 such as that labeled "Diagnostics"), transient worksheets (e.g., a transient worksheet 606 such as those labeled "CodePosition" or "DiagnosticsCount"), and/or output worksheets (e.g., an output worksheet 608 such as that labeled "CarbonDioxideScrubberCode"). A relationship between one or more nodes 602 is indicated in the figure in representative form by lines connecting the related nodes to one another. For example, the input worksheet 604 has a relationship with transient worksheets 606 (e.g., transient worksheets 606 may utilize input data in the input worksheet 604). Transient worksheets 606 as shown each have a relationship with the output worksheet 608, and may also have relationships with one or more intermediate nodes, which may or may not be shown. One or more nodes 602 may be grouped into a fragment 640 (as indicated in broken lines) according to techniques described herein. In various use cases, or at different steps of a method described herein, one or more nodes 602 of the data entity display may be grouped into fragments, or none of the nodes 602 may be grouped into fragments. Optionally, the display of such fragments may be selected or deselected by the user.

By selecting a node 602 (e.g., by right-clicking on the node or the like), a user may be presented with a menu 610 including operations that may be executed for the selected node 602. For example, the function "compute from here" may execute a fragment (e.g., the fragment 640), or a portion of a fragment, containing the selected node. Some functions may allow a user to manually edit a fragment (e.g., by dragging and dropping nodes into fragments). A version log 620 may be provided, and may include a change history. Operations such as 'undo changes' or 'revert to last saved state' (not shown) may be available from the version log.

Figure 7:
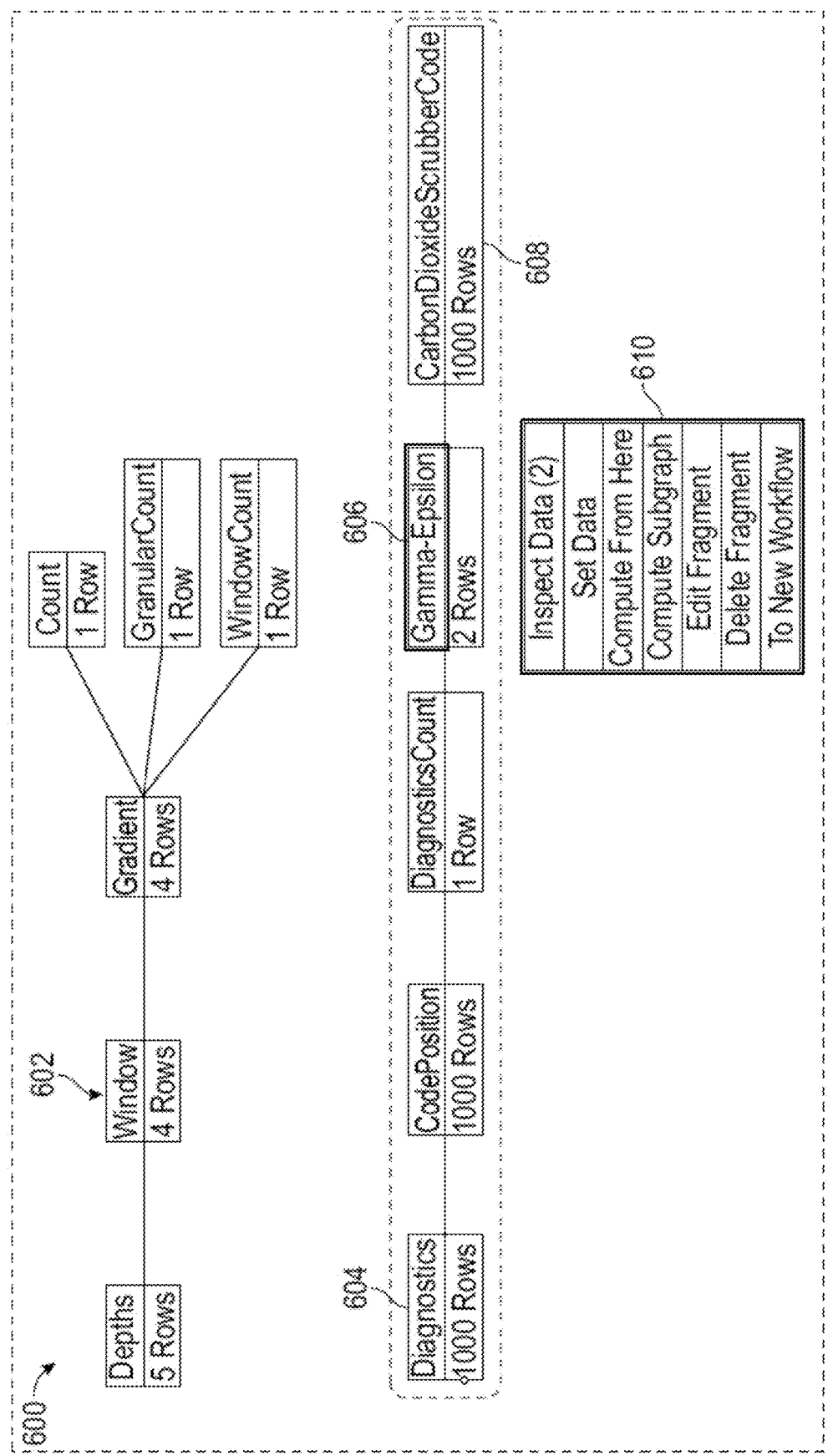
FIG. 7 illustrates a data entity oriented display of a spreadsheet, in accordance with another representative embodiment.

FIG. 7 illustrates a data entity oriented display of a worksheet, in accordance with another representative embodiment, where reference numbers are as described in FIG. 6 above. In an example use case, a user may be presented with a representation of the spreadsheet 600. The user may select a portion of the spreadsheet, in this example the transient worksheet 606 labeled "Gamma-Epsilon". When selected, the transient worksheet 606 may be highlighted (e.g., with a bold outline or in a different color than other nodes 602) and the menu 610 may be presented to the user. In some cases, the functions included in the menu 610 may be present when either a transient worksheet 606 is selected or when an input worksheet 604 is selected (e.g., see the menu 610 of FIG. 6). In this manner, testing and debugging may be performed at the fragment level or at the worksheet level as desired by the user.

In some cases, the user may be able to alternate the displayed view between the data entity views of FIGS. 6-7, the workflow views of FIGS. 2-4, and a tabular data view as discussed with reference to FIG. 8 below. The menu 610, or another menu, may include functions to transition between the available views (e.g., the "Inspect Data" function shown in FIG. 7).

Figure 8:
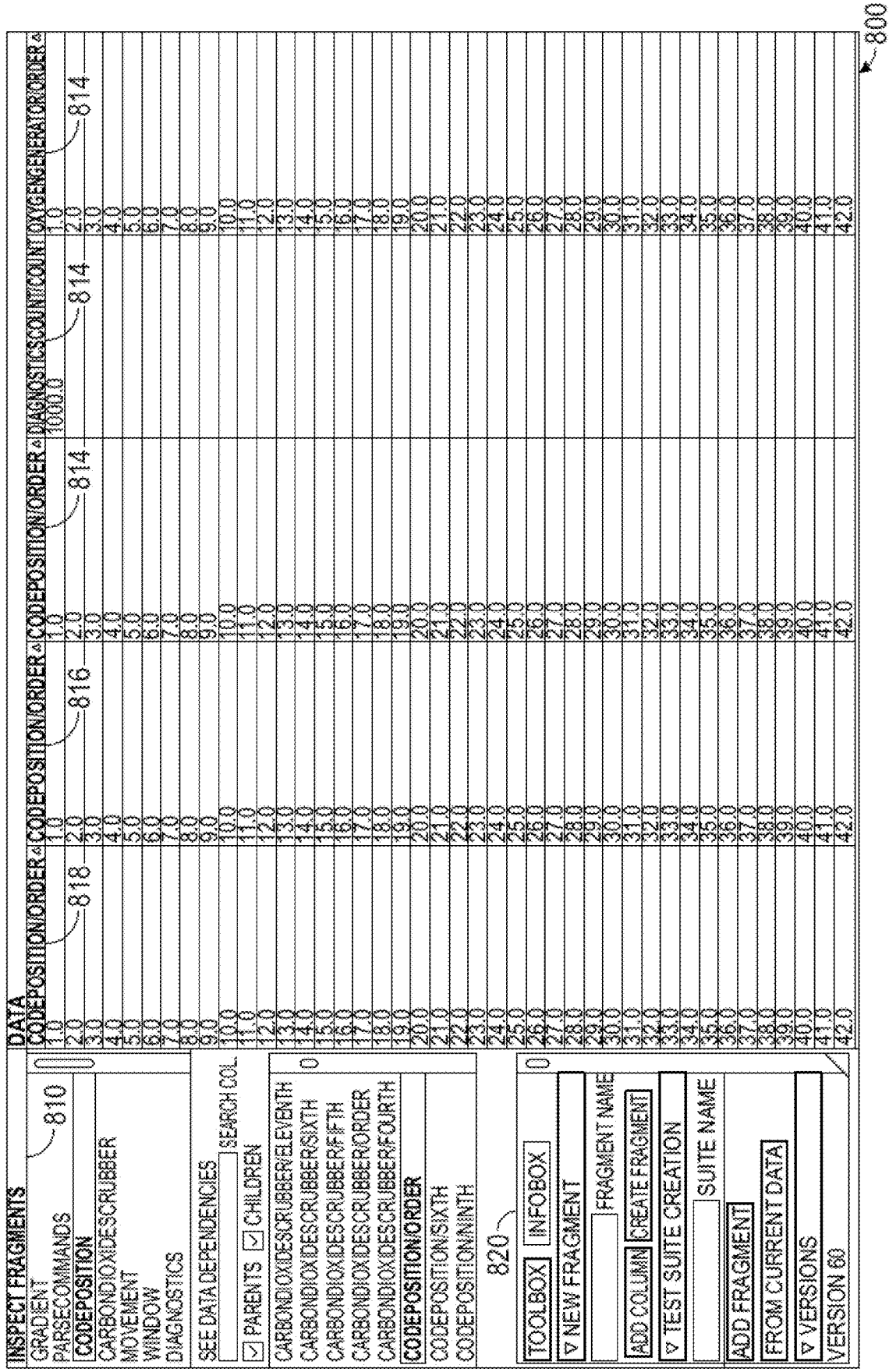
FIG. 8 illustrates a tabular display of a one or more fragments, in accordance with a representative embodiment.

FIG. 8 illustrates a tabular display of one or more fragments 800, in accordance with a representative embodiment. While this view may appear similar to a spreadsheet, it may present multiple worksheets or collections of cells from one or more spreadsheets in a combined view for simplicity. A fragment of a project may be selected for display, for example by selecting the "Inspect Fragments" item from the menu 810. The view may be expanded to include multiple fragments. A version log 820 may be similar or identical to the version log 620 of the data entity oriented displays of FIGS. 6 and 7. Columns of data may be labeled (e.g., with different colored headings, or otherwise labeled) to indicate an association with a type of worksheet (e.g., an input worksheet, an output worksheet, or a transient worksheet). For example, output worksheets 814 (three columns shown) may be labeled with a first color, such as purple. A transient worksheet, 816, may be labeled with a second color, such as green, and an input worksheet 818 may be labeled with a third color, such as red. Some spreadsheet components may be categorized under multiple types. For example, the worksheet with the heading of "CodePosition/order" is shown here three times, as an input worksheet 818, a transient worksheet 816, and an output worksheet 814.

Additional Embodiments

Some additional embodiments that further describe the systems and techniques of the present teachings will now be described, where it will be understood that, unless expressly stated to the contrary or otherwise clear from the context, any one or more of these additional embodiments may include any of the features described with reference to any one or more of the embodiments described above.

Embodiments of the present teachings may include a fragment that includes portions (e.g., collections of cells) taken from a plurality of different spreadsheets. For example, a fragment may include an input worksheet derived from a first spreadsheet, a transient worksheet derived from a second spreadsheet, and an output worksheet derived from a third spreadsheet, where the first, second, and third spreadsheets are different from one another. Other combinations are also or instead possible as will be understood by a skilled artisan—e.g., an input worksheet and an output worksheet of a fragment can be derived from a first spreadsheet, while a transient worksheet of this fragment can be derived from a second spreadsheet, and so on.

It will further be understood that one or more spreadsheets could be fragmented, and each fragment, being a collection of worksheets, may be its own spreadsheet. And thus, certain embodiments can include fragments or portions thereof that are formed by other fragments—i.e., the spreadsheet formed by a fragment may itself be fragmented.

In certain aspects, a fragment may include only one worksheet. For example, a fragment may be created for a spreadsheet having a single output worksheet configured to create associated output data. This fragment—which, for this example can be referred to as a first fragment—may be provided to a computing device of a user, where the computing device is operable to access a plurality of different fragments, which, for this example can be referred to as second fragments. In this manner, a user (or automated program or the like) can select a second fragment that is configured to create associated second output data, where the second fragment includes (i) a second output worksheet and (ii) one or more transient worksheets and input worksheets that are used to create the associated second output data for the second output worksheet. A first processing task may then be created or selected that includes using the first fragment to create its associated output data. And, in response to the selection of the second fragment, a second processing task may be created or automatically selected that includes providing the associated output data created by the first fragment, utilizing the associated output data created by the first fragment as input data to the transient worksheets and input worksheets of the second fragment, and creating the associated second output data, by the second fragment. In this manner, it will be understood that the output worksheet of any given fragment may become one of the input worksheets of another fragment.

Figure 9:
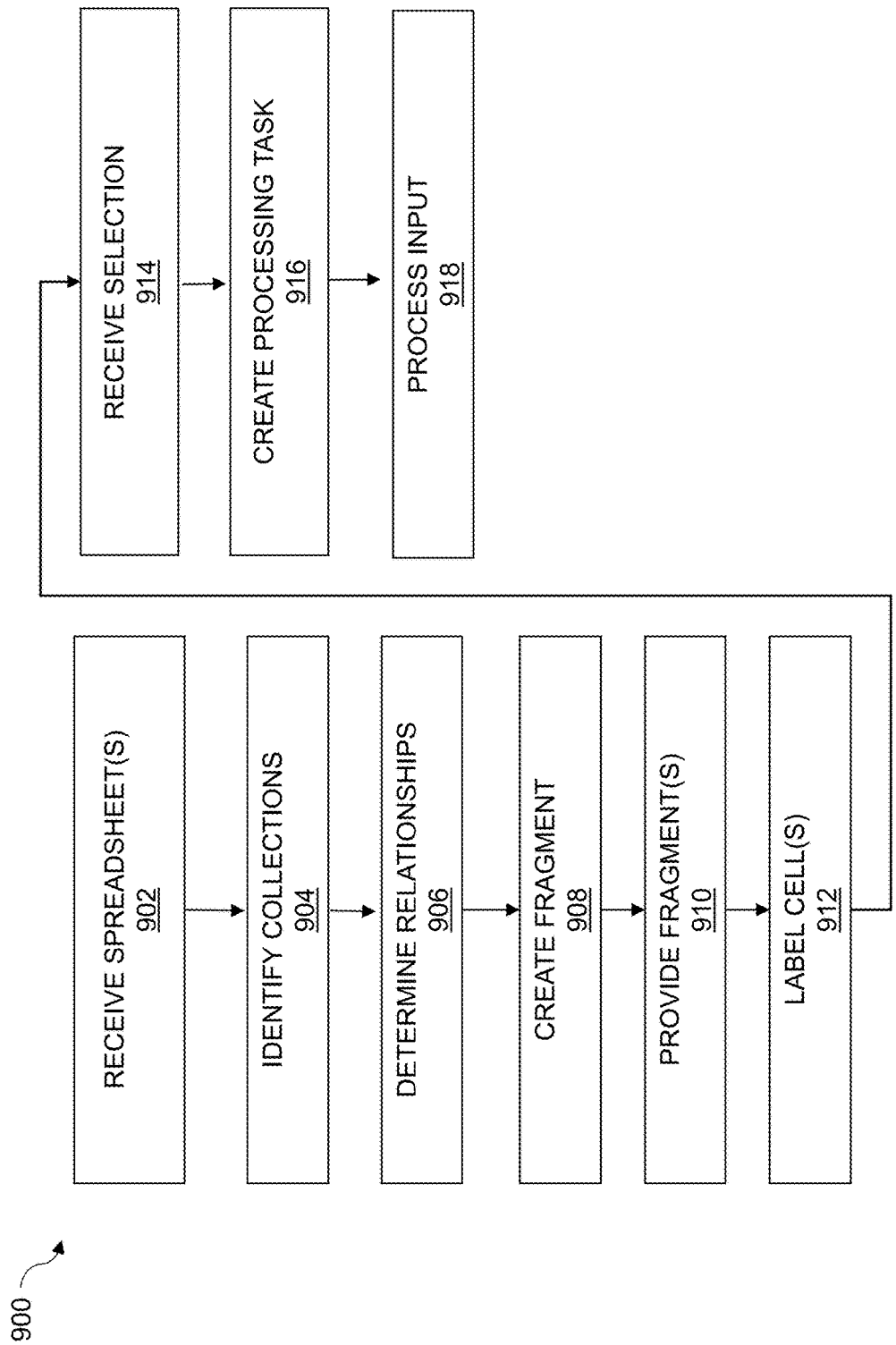
FIG. 9 is a flow chart of a method for fragmenting spreadsheets, in accordance with a representative embodiment.

FIG. 9 is a flow chart of a method for fragmenting spreadsheets, in accordance with a representative embodiment. The method 900 may utilize any of the systems or platforms described herein, e.g., the system 100 described with reference to FIG. 1. In general, the method 900 represents a technique for processing one or more spreadsheets by fragmenting the spreadsheets into collections of one or more cells, enabling isolation into fragments of one or more processing tasks performed by the one or more spreadsheets. These fragments may advantageously be displayed to a user for interaction and understanding of a spreadsheet, or several interdependent spreadsheets; executed as independent processes; and/or multiple fragments from the one or more spreadsheets may be distributed between multiple processors. The method 900 may thus allow for improved visualization of the functionality of one or more spreadsheets, as well as improved processing efficiency. Stated otherwise, the method 900 may be used to: display one or more fragments for selection by a user; isolate processing tasks of one or more spreadsheets; and/or process one or more spreadsheets to enhance computational efficiency.

As shown in step 902, the method 900 may include receiving one or more spreadsheets. For example, one or more spreadsheets may be received by a remote computing resource, such as via a network upload performed by a user. The one or more spreadsheets may collectively include one or more worksheets. In an example case, step 902 may include receiving three spreadsheets, each having one or more worksheets (e.g., a first spreadsheet may have one or more input worksheets; a second spreadsheet may have one or more transient worksheets; and a third worksheet may have one or more output worksheets). In another example case, step 902 may include receiving only one spreadsheet having multiple worksheets. In yet another example, step 902 may include receiving a single spreadsheet having a single worksheet. In some instances, one spreadsheet may be formed by combining more than one spreadsheet (e.g., worksheets of multiple spreadsheets may be merged into one spreadsheet). Such combination of spreadsheets may occur before or after the one or more spreadsheets are received. Similarly, one or more worksheets within one or more spreadsheets may be combined into a single worksheet (e.g., by appending the cells of a second worksheet onto a first worksheet).

As shown in step 904, the method 900 may include identifying collections of one or more cells within the one or more worksheets. The collections of one or more cells may be, for example, all cells of a worksheet (i.e., a worksheet is one example of a collection of one or more cells), at least a portion of the cells of a column, at least a portion of the cells of a row, at least a portion of the cells of multiple columns, at least a portion of the cells of multiple rows, a single cell, or other collections of cells readily envisioned by the skilled artisan. Step 904 may include identifying a first collection of one or more cells comprising output data within the one or more worksheets. As the first collection of one or more cells includes output data, it may have similar properties to those described in relation to an output worksheet, and it may be processed in a similar manner as an output worksheet as described elsewhere herein. In some cases, the first collection of one or more cells may be an output worksheet. The method 900 may also include identifying the one or more cells used to create the output data as a second collection of one or more cells. The second collection of one or more cells may have similar properties to those described in relation to a transient worksheet, and may be processed in a similar manner as a transient worksheet as described elsewhere herein. In some cases, the second collection of one or more cells may be an actual worksheet as that term is commonly used in the art. The method 900 may also include identifying a third collection of one or more cells comprising the input data used by the second collection of one or more cells to create the output data. The third collection of one or more cells may have similar properties to those described in relation to an input worksheet, and may be processed in a similar manner as an input worksheet. In some cases, the third collection of one or more cells may be an input worksheet as described elsewhere herein.

In one example, the first collection of one or more cells, the second collection of one or more cells, and the third collection of one or more cells may all be identified within a first spreadsheet of the one or more spreadsheets. Said another way, the first collection, second collection, and third collection may all be present within a first spreadsheet. In a specific case of this example, at least two of the first collection of one or more cells, the second collection of one or more cells, and the third collection of one or more cells may be identified within a first worksheet of the first spreadsheet. In other words, the first collection and second collection may be present in a first worksheet of the first spreadsheet, while the third collection may be present within a second worksheet of the first spreadsheet. In another example, one of the first collection of one or more cells, the second collection of one or more cells, and the third collection of one or more cells may be identified within a first spreadsheet of the one or more spreadsheets and another of the first collection of one or more cells, the second collection of one or more cells, and the third collection of one or more cells and may be identified within a second spreadsheet of the one or more spreadsheets. In a specific example case, the first and second collections may be found within a first spreadsheet, while the third collection may be within a second, different spreadsheet. Thus, it will be understood that the present teachings may be utilized for creating fragments from a single worksheet of a single spreadsheet, multiple worksheets of a single spreadsheet, multiple worksheets of multiple spreadsheets, and combinations thereof.

As shown in step 906, the method 900 may include determining relationships between collections of cells, e.g., as described with reference to FIG. 2, where discussion of the display regarding worksheets may be applied, mutatis mutandis, to collections of cells. Determining relationships may include, e.g., for the output data, determining which one or more cells within the one or more worksheets is used to create the output data using input data.

The method 900 may thus include identifying that the second collection of cells is related to the first collection of cells. Further, a first collection of cells may contain first output data. The second collection of cells may be used to create the output data, and the method 900 may thus include identifying that the second collection of cells is related to the first collection of cells. The method 900 may also determine that the third collection of cells is related to the first collection of cells, by virtue of the relationship between the third collection of cells and the second collection of cells.

As shown in step 908, the method 900 may include creating a first fragment including the first collection of one or more cells, the second collection of one or more cells, and the third collection of one or more cells. In some instances, a first fragment may consist only of the first collection of one or more cells, the second collection of one or more cells, and the third collection of one or more cells. In other cases, the first fragment may also include additional cells or collections of cells.

As shown in step 910, the method 900 may include providing one or more fragments (e.g., the first fragment) on a display of a computing device (e.g., the display 112 of the user device 110 in FIG. 1). In some instances, the method 900 may include providing a plurality of fragments to a computing device of a user for display and selection of at least a portion of the plurality of fragments by the user.

As shown in step 912, the method 900 may include labeling the one or more cells (e.g., the first, second, or third collection of cells). This step 912 may include displaying the labels on a computing device of a system according to the present teachings. Labeling one or more cells may also, or instead, be considered an aspect of identifying collections of one or more cells within the one or more worksheets. For example, labeling one or more cells may include assigning the one or more cells to at least one of the first collection of one or more cells, the second collection of one or more cells, and the third collection of one or more cells. Cells or collections of cells may, for example, be labeled with distinct colors, such as by using a colored outline, background, and/or tab. For example, and with reference to FIG. 8, a first collection of cells 814 may include several columns having column headers labeled with a first color, (e.g., purple). A second collection of cells, 816, may include one column having a column header labeled with a second color different from the first color (e.g., green). A third collection of cells, 818, may include one column having a column header labeled with a third color different from both the first and second colors, (e.g., red). Stated another way, labeling collections of cells may include marking the collections by type, where such marking of the collections by type may include assigning a color to collections based on type. Other types of labeling (e.g., not depending on color) are also or instead possible, as will be understood by a skilled artisan.

Referring again to FIG. 9, as shown in step 914, the method 900 may include receiving a selection, (e.g., a user may input a selection into a user device included in a system according to the present teachings). The selection may include a component of the first fragment. The selected component may include one or more of the first collection of one or more cells, the second collection of one or more cells, and the third collection of one or more cells contained within the first fragment.

As shown in step 916, the method 900 may include creating a processing task that includes at least the first fragment (e.g., in response to the selection, creating a processing task that includes the selected component(s)). This processing task may be one, or a subset, from among many processing tasks included in the one or more spreadsheets.

As shown in step 918, the method 900 may include receiving an input from a user and processing the input according to the processing task. In certain implementations, only the processing task related to a single selected fragment (e.g., the first fragment) is performed to process the input, in the absence of other processing tasks associated with the spreadsheet. Thus, the processing task may be performed in isolation relative to other processing tasks associated with the spreadsheet. As described in relation to method 900, processing the input may include any of evaluating the processing demand associated with the processing task, evaluating one or more processors of a plurality of processors, and distributing processing tasks to the plurality of processors based on the evaluation.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionalities may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. For example, regarding the methods provided above, absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of processing spreadsheets to enhance computational efficiency, the method comprising:

receiving a spreadsheet having a plurality of worksheets, the plurality of worksheets including a combination of a plurality of input worksheets, output worksheets, and transient worksheets, wherein the transient worksheets utilize input data in one or more of the input worksheets to facilitate creation of output data in one or more of the output worksheets;

fragmenting the spreadsheet including:

determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment consisting of (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets;

evaluating an associated processing demand for each of the plurality of fragments; and based on the evaluation of the associated processing demand, distributing each of the plurality of fragments to a processor of a plurality of processors.

2. The method of claim 1, wherein fragments having a processing demand greater than a predetermined threshold are distributed to one or more first processors, and wherein fragments having a processing demand less than the predetermined threshold are distributed to one or more second processors.

3. The method of claim 2, wherein the one or more first processors and the one or more second processors are the same type of processors.

4. The method of claim 2, wherein the one or more first processors and the one or more second processors are different types of processors.

5. The method of claim 2, wherein the one or more first processors and the one or more second processors have different properties.

6. The method of claim 2, wherein the one or more first processors and the one or more second processors have the same or similar properties.

7. The method of claim 1, further comprising evaluating one or more processors of the plurality of processors, and using the evaluation of the one or more processors in combination with the evaluation of the associated processing demand as bases for distributing each of the plurality of fragments to the one or more processors.

8. The method of claim 7, wherein the evaluation of the one or more processors includes at least one of an availability of the one or more processors and a processing capability of the one or more processors.

9. The method of claim 7, wherein the evaluation of the one or more processors includes a processing cost associated with the one or more processors.

10. The method of claim 7, wherein the evaluation of the one or more processors includes a processing time associated with using the one or more processors.

11. The method of claim 1, further comprising:
determining, for each of the plurality of fragments, a state of required input data for use by the one or more transient worksheets to create the associated output data, the state related to a presence or absence of all of the required input data;
upon determining, for a first fragment of the plurality of fragments, that all of the required input data is present, enabling processing of the first fragment; and
upon determining, for a second fragment of the plurality of fragments, that all of the required input data is not present, delaying processing of the second fragment until a later time.

12. The method of claim 11, further comprising:
storing output data for the first fragment;
storing data related to the second fragment;
determining, for the second fragment at the later time, that all of the required input data is present;
processing the second fragment using the stored data related to the second fragment; and
retrieving the stored output data for the first fragment.

13. The method of claim 1, further comprising:
providing at least one fragment of the plurality of fragments on a display of a computing device; and
displaying, upon selection of at least a portion of the at least one fragment by a user of the computing device, a relationship between the particular output worksheet and the one or more transient worksheets and input worksheets that are used to create the associated output data of the at least one fragment.

14. The method of claim 13, further comprising providing the plurality of fragments on the display of the computing device.

15. The method of claim 14, further comprising labeling components of each of the plurality of fragments on the display.

16. The method of claim 15, wherein labeling components includes assigning a color to components based on type.

17. The method of claim 14, further comprising:
receiving a selection of a component of at least one fragment of the plurality of fragments, the component including one or more of an input worksheet, a transient worksheet, and an output worksheet contained within the at least one fragment; and
in response to the selection, displaying each component of the at least one fragment that is related to the selected component.

18. The method of claim 14, further comprising:
providing a plurality of datapoints on the display of the computing device, wherein each of the plurality of datapoints is associated with one or more components of one or more of the plurality of fragments;
receiving a selection of at least one datapoint of the plurality of datapoints; and
displaying the one or more components of the one or more of the plurality of fragments that are associated with the selected datapoint.

19. A computer program product for processing spreadsheets to enhance computational efficiency, the computer program product comprising computer executable code embodied in a non-transitory computer readable medium that, when executing on one or more computing devices, performs the steps of:
receiving a spreadsheet having a plurality of worksheets, the plurality of worksheets including a combination of a plurality of input worksheets, output worksheets, and transient worksheets, wherein the transient worksheets utilize input data in one or more of the input worksheets to facilitate creation of output data in one or more of the output worksheets;
fragmenting the spreadsheet including:
determining, for each of a plurality of output worksheets that each create associated output data, which one or more transient worksheets is used to create the associated output data, and which one or more input worksheets is used by the one or more transient worksheets to create the associated output data; and
creating, for each of the plurality of output worksheets, a fragment consisting of (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets;

evaluating an associated processing demand for each of the plurality of fragments; and based on the evaluation of the associated processing demand, distributing each of the plurality of fragments to a processor of a plurality of processors.

20. A system for processing spreadsheets to enhance computational efficiency, the system comprising:

a data network;

a plurality of processors coupled to the data network; and a remote computing resource coupled to the data network, the remote computing resource including a processor and a memory, the memory storing code executable by the processor to perform the steps of:

receiving, over the data network, a spreadsheet having a plurality of worksheets, the plurality of worksheets including a combination of a plurality of input worksheets, output worksheets, and transient worksheets, wherein the transient worksheets utilize input data in one or more of the input worksheets to facilitate creation of output data in one or more of the output worksheets;

fragmenting the spreadsheet including:

determining, for each of a plurality of output worksheets that each create associated output data, which one or more transient worksheets is used to create the associated output data, and which one or more input worksheets is used by the one or more transient worksheets to create the associated output data; and creating, for each of the plurality of output worksheets, a fragment consisting of (i) a particular output worksheet of the plurality of output worksheets, and (ii) the one or more transient worksheets and input worksheets that are used to create the associated output data for the particular output worksheet, thereby providing a plurality of fragments including a fragment for each of the plurality of output worksheets;

evaluating an associated processing demand for each of the plurality of fragments; and based on the evaluation of the associated processing demand, distributing each of the plurality of fragments to a processor of the plurality of processors.

* * * * *